(12) United States Patent
Goto et al.

(10) Patent No.: US 11,439,941 B2
(45) Date of Patent: *Sep. 13, 2022

(54) LOCALIZED AIR FILTRATION SYSTEM

(71) Applicant: AGS Zephyr Inc., Toronto (CA)

(72) Inventors: Kazuhiro Goto, Burlington (CA);
Salvatore Alesio, Newmarket (CA);
Robert Sowka, Fonthill (CA)

(73) Assignee: AGS ZEPHYR INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,871

(22) Filed: Jan. 27, 2022

(65) Prior Publication Data

US 2022/0176293 A1    Jun. 9, 2022

Related U.S. Application Data

(63) Continuation of application No. 17/315,800, filed on May 10, 2021, now Pat. No. 11,247,163.

(60) Provisional application No. 63/121,493, filed on Dec. 4, 2020.

(30) Foreign Application Priority Data

Dec. 4, 2020   (CA) ...................................... 3101722
Apr. 7, 2021   (CA) ...................................... 3114226

(51) Int. Cl.
*B01D 46/00*   (2022.01)
*F24F 8/10*    (2021.01)

(52) U.S. Cl.
CPC ..... *B01D 46/0047* (2013.01); *B01D 46/0005* (2013.01); *B01D 46/0086* (2013.01); *F24F 8/10* (2021.01); *B01D 2279/40* (2013.01); *B01D 2279/50* (2013.01)

(58) Field of Classification Search
CPC ................ B01D 46/00; B01D 46/0005; B01D 46/0047; B01D 46/0086; B01D 2279/40; B01D 2279/50; B01D 50/00; B01D 35/30; F24F 8/10
USPC ....... 55/385.1, 481, 410, 418, 472, DIG. 34; 95/273; 96/417, 224
See application file for complete search history.

(56) References Cited

U.S. PATENT DOCUMENTS

| 4,647,295 A | 3/1987 | Christ |
| 5,141,539 A | 8/1992 | Hiouani |
| 5,230,720 A | 7/1993 | Kendall |
| 5,441,279 A | 8/1995 | Messina |

(Continued)

FOREIGN PATENT DOCUMENTS

| CN | 112056765 A | 12/2020 |
| TW | M604863 U   | 12/2020 |

*Primary Examiner* — Minh Chau T Pham
(74) *Attorney, Agent, or Firm* — Moser Taboada

(57) ABSTRACT

An air purification unit is provided for individuals seated at a table that has a unit body adapted to be mounted at a mounting height at or above the approximate head height of individuals seated at the table, and in a position between the individuals. A motorized fan system is provided within the unit body that is configured to draw air from at least one inlet proximate the bottom of the unit body. A filter is positioned in communication with the inlet and the fan system for filtering air drawn through the inlet. The unit body has at least two ducted outlets disposed radially or axially for discharging filtered air toward the individuals, while the unit prevents cross-flow of breath air between the individuals.

21 Claims, 26 Drawing Sheets

(56) References Cited

U.S. PATENT DOCUMENTS

| | | | |
|---|---|---|---|
| 5,443,625 A * | 8/1995 | Schaffhausen | F21V 33/0096 |
| | | | 55/472 |
| 5,562,286 A | 10/1996 | Brinket | |
| 6,099,607 A | 8/2000 | Haslebacher | |
| 6,244,720 B1 * | 6/2001 | Neff | F24F 3/056 |
| | | | 362/253 |
| 6,248,147 B1 * | 6/2001 | Liao | B01D 46/10 |
| | | | 96/417 |
| 6,318,113 B1 | 11/2001 | Levy et al. | |
| 6,780,213 B2 | 8/2004 | Chang et al. | |
| 7,025,798 B2 | 4/2006 | Endo | |
| 7,641,720 B2 | 1/2010 | Li | |
| 8,333,816 B2 | 12/2012 | Kummer et al. | |
| 9,700,821 B2 | 7/2017 | Grider et al. | |
| 10,993,534 B1 | 5/2021 | Pike | |
| 11,247,163 B1 * | 2/2022 | Goto | F24F 8/10 |
| 2001/0049927 A1 | 12/2001 | Toepel | |
| 2004/0020363 A1 * | 2/2004 | LaFerriere | B01D 46/0028 |
| | | | 55/472 |
| 2004/0211161 A1 | 10/2004 | Avery | |
| 2009/0173233 A1 | 7/2009 | Ottesen et al. | |
| 2009/0205498 A1 | 8/2009 | Wang et al. | |
| 2009/0311951 A1 * | 12/2009 | Walkinshaw | F24F 13/26 |
| | | | 96/60 |
| 2017/0248303 A1 | 8/2017 | Hardgrave | |
| 2019/0105458 A1 | 4/2019 | Hammes et al. | |

* cited by examiner

LOCALIZED AIR FILTRATION SYSTEM

CROSS-REFERENCE TO RELATED APPLICATIONS

This application is a continuation of U.S. patent application Ser. No. 17/315,800, filed May 10, 2021, now U.S. Pat. No. 11,247,163 B1, which claims priority to U.S. provisional patent application Ser. No. 63/121,493, filed Dec. 4, 2020, Canada patent application 3,101,722 filed Dec. 4, 2020, and Canada patent application 3,114,226, filed Apr. 7, 2021, all of which are herein incorporated by reference in their entirety.

FIELD OF INVENTION

The invention relates to air filtration systems and more particularly relates to systems providing localized filtering for individuals at a table.

BACKGROUND OF THE INVENTION

COVID-19 is affecting the entire world due to its high transmission rate. One of the known transmission channels is through surface transmission where people touch contaminated surfaces, then touch their mouth, nose and eyes, allowing the virus to get inside the body. This mode of transmission can be prevented by frequent washing of hands and by not touching the face. Another transmission channel is through airborne viruses inhaled by people. Numerous attempts are being made to control the airborne transmission by improving the efficiency of ventilation systems in an attempt to reduce the virus content in enclosed rooms. However, the general filtering system does not address viruses carried by ventilation air itself. In fact, a strong airstream from a ventilator helps spread the viruses from an infected person to nearby locations. Also, it does not address local transmission between people who are sitting around a table without a mask, such as in indoor restaurants. One attempt employs high partitions between tables and air ducts bringing in fresh air and carrying away contaminated air between the partitions. This method addresses the draft issue but does not address the transmission of viruses between people around the same table.

Thorough filtration of room air against viruses (such as systems used in laboratories, hospitals or clean rooms) requires highly powerful fans, which are expensive and so noisy as to be incompatible with a quiet dining or working environment. And even then, such systems may not prevent virus transmission between people sitting nearby without a mask.

A few attempts have been made to provide personalized or small-area air filtration, however, the devices focus on filtering localized air against ambient dust, odors or smoke. To the extent that such devices address viruses, the focus in on filtering general room air, rather than preventing virus transmission between people seated together.

It would be desirable to have a filtration device that draws in and filters air from a small area and delivers virus-free filtered air directly to people sitting around a table while blowing away or blocking breath air from neighboring individuals.

SUMMARY OF THE INVENTION

Broadly speaking, the invention provides local air filtration system strategically placed in such a way that the filtered air is delivered to people who are sitting around the table directly. Since they are breathing in the filtered air, there is very little danger of virus infection. Viruses shed from a person at the table will mostly be blown away from the table before reaching the person next to him. A small amount of viruses migrating into the table area is sucked up by the intake portion of the filtration system, thus preventing them from getting to others nearby.

According to a first aspect of the invention, an air purification unit is provided for individuals seated at a table. The unit has a unit body adapted to be mounted at a mounting height at or above the approximate head height of individuals seated at the table, and in a position between the individuals. A motorized fan system is provided within the unit body, which is configured to draw air from at least one inlet proximate the bottom of the unit body. A filter is positioned in communication with the inlet and the fan system for filtering air drawn through the inlet. The unit body has at least two ducted outlets disposed radially or axially for discharging filtered air toward the individuals, while preventing cross-flow of breath air between the individuals.

Preferably, the mounting height is at least approximately 2 feet above an upper surface of the table.

Preferably, the filter is a HEPA filter. For instance, the filter is preferably rated H13 or higher.

The filter may be contained in a releasable filter holder.

In some embodiments, the unit further includes a base for allowing the unit to be mounted on a table top. (This may be a portion of or continuous with the filter holder.) In some cases, the inlet is provided in the base.

Preferably, the body includes an upper plate and a lower plate. Ducts may be formed between the upper and lower plates.

In some embodiments, the unit further includes hangers for hanging the unit (such as above a table).

In some embodiments of the unit, the inlet may be provided on a bottom surface of the unit body. Other positions of the inlet are possible and contemplated.

Preferably, the unit further includes vanes to direct air flow. The vanes may be curved. The vanes may be adjustable. In addition or in the alternative, at least one deflector may be provided to direct air flow downward.

Preferably, the fan system includes a motor of a type selected from the group consisting of: AC induction, DC brushed, and DC brushless. The motor may have a speed of at least about 500 rpm. In some embodiments, the motor speed is adjustable.

Preferably, the unit further includes a lighting unit disposed on a surface of the body. The lighting unit may include at least one LED. The LED may or may not be programmable. In certain cases, the lighting unit may be programmed to change an illumination colour or pattern of the LED when the filter needs changing. The lighting unit may include a timer for signalling a filter replacement interval.

According to a second aspect of the invention, an air purification unit is provided that has a unit body with an upper plate and a lower plate with an air inlet. A motorized fan system is disposed at least in part between the upper plate and the lower plate. A series of ducts is formed between the upper plate and lower plate. A releasable filter unit is provided in communication with the air inlet and including a HEPA filter. The fan system draws air through the filter and discharges filtered air radially or axially outward from the ducts in the unit body, with each duct directing a flow of filtered air in a plane different from that of the air inlet. In one embodiment, the unit body is circular (or otherwise substantially symmetrical across one or more axes). Other shapes and configurations are possible.

Note that in some embodiments, the motorized fan system is disposed completely between the upper and lower plates, while in others, the fan itself may be buried in the lower plate. The upper and lower plates need not have a planar shape but may be more contoured in a bowl-shaped or pan-shaped arrangement to accommodate portions of the motorized fan system and support the desired shape of the ducts.

According to a third aspect of the invention, an air purification unit is provided that has a unit body with an upper plate and a lower plate with an air inlet. A motorized fan system is disposed at least in part between the upper plate and the lower plate. A series of ducts is formed between the upper plate and lower plate. A releasable filter unit is provided in communication with the air inlet and includes a replaceable filter cartridge. A lighting unit is provided disposed on an underside of the lower plate. The fan system draws air through the filter and discharges filtered air radially or axially outward from the ducts in the unit body, while the lighting unit provides general illumination in an illumination colour. In one embodiment, the unit body is circular (or otherwise substantially symmetrical across one or more axes). Other shapes and configurations are possible.

The lighting unit may include at least one LED. In a simple embodiment, the LED may be a single color LED. In other cases, one or more programmable LEDs may be used, which may be programmed to change illumination colour when the filter cartridge needs changing.

BRIEF DESCRIPTION OF THE DRAWINGS

These and other objects of the invention will become apparent from reading a detailed description taken in conjunction with the drawings, in which.

Figure 1:
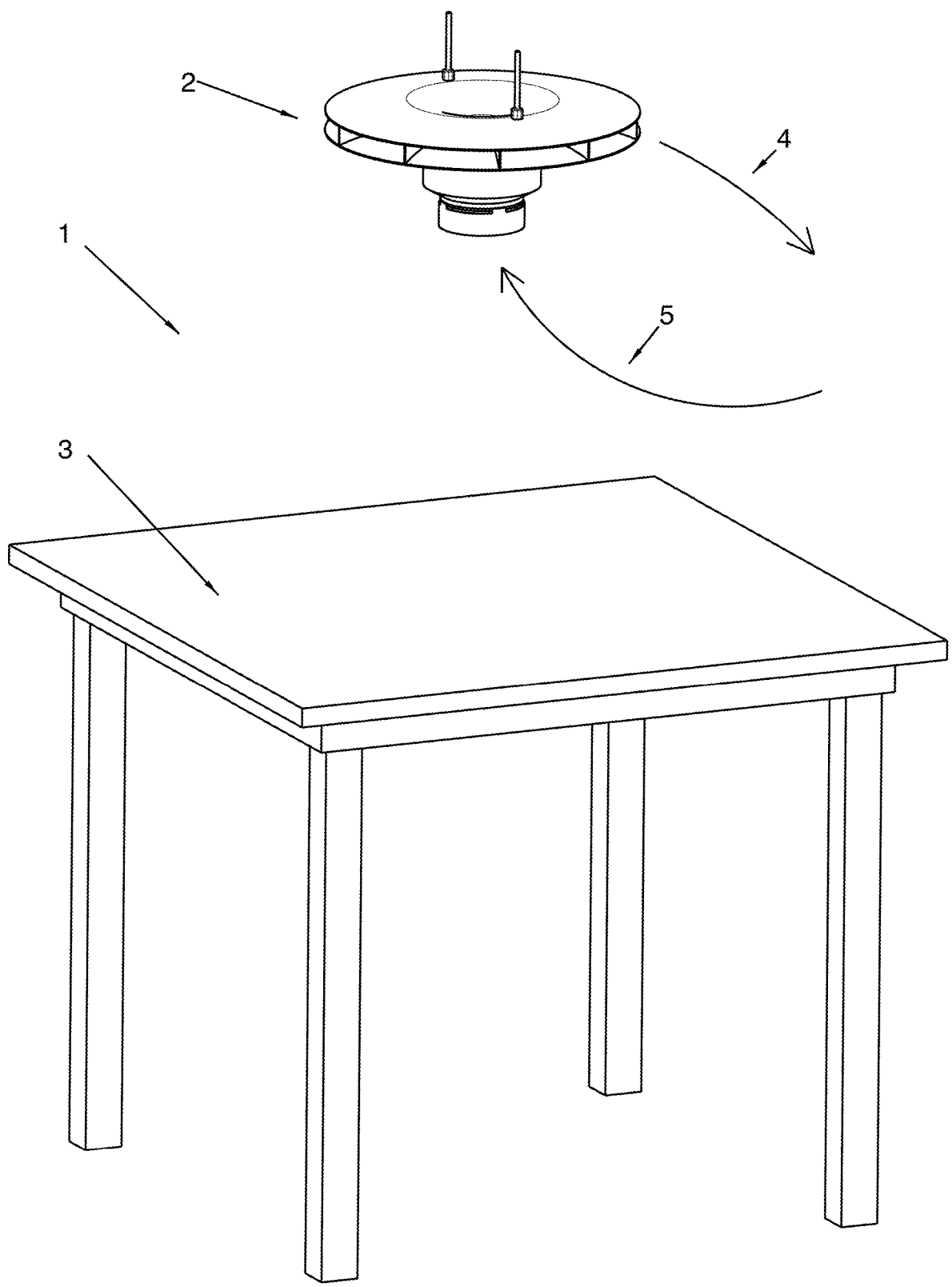
FIG. 1 is a drawing showing an embodiment of an axial fan air purification unit hanging over a table.

The present concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrated embodiments described below and the following description should be read in such light.

DETAILED DESCRIPTION

As described herein, local air filtration system can be strategically placed in such a way that the filtered air is delivered to people who are sitting around a table directly. Since they are breathing in filtered air, there is very little danger of virus infection. Viruses shed from a person at the table will mostly be blown away from the table before reaching the person next to him. A small amount of viruses migrating into the table area is sucked up by the intake portion of the filtration system, thus preventing them from getting to others nearby.

An advantage of the present invention is that the air intake is proximate to the bottom of the device. Either in tabletop configuration or hanging above a table, the low position of the air intake allows a very efficient capture of breath air, as it is close to the mouths of the individuals seated at the table. However, the air outlet(s) is in a different plane (above, laterally offset) from the air intake, thereby allowing the filtered air to be directed toward the individuals, rather than sucked right back into the unit.

This is contrary to devices that tend to pull air from above (e.g. smoky air which may be accumulated near the ceiling).

Further, the low position of the air intake can be paired with a filter unit at the bottom of the device as well. One of the advantages of a filter at the bottom is that it prevents dust from settling on the surface of the filter. A top mounted filter will tend to catch dust from the ambient air, shortening the life of the filter significantly. An accessible filter at the bottom of the device also makes the filter more readily accessible for replacement or maintenance.

Since this system provides controlled air locally, there is no need to put up a partition between tables as being practiced in some restaurants, offices, and meeting rooms. With the cost effective construction of this device, a safer environment is created without exorbitant cost for partitions or a sophisticated HVAC filtering system.

Various embodiments of such an air purification system are described. Two broad categories of the embodiments use axial or radial fan assemblies.

In one option, the fan is an axial design to bring the air from the bottom of the unit through a filter and delivers it into the duct formed between two housings. In this case, the upper housing may have a curved circular surface with a smaller radius near the center which joins with a curved surface with a much larger radius. The lower housing may also have a curved surface with a much smaller radius near where it meets the top of the fan unit and a much larger radius curved surface joining the inner surface and the outer extreme of the housing. These housings may be shaped in such a way that the upward moving filtered air is redirected sideways and somewhat downward. Other shapes of upper and lower plates may be used (e.g. non-curved configurations).

In another option, the fan is a radial design. The air comes in from the bottom through a filter in the same way, but the air is exhausted in a radial direction. Unlike conventional radial fans, the housing is not designed to gather air to deliver it from one port. Instead, the air is delivered in all directions evenly.

In addition, in both cases, a series of curved vanes can be molded in the top or bottom housings. The air coming out of the fan is moving in a circular motion. These curved vanes redirect the circular air movement, in such a way that the air comes out of the device predominantly in radial direction. This ensures that the filtered air coming out of the device does not continue moving in a circular direction. If this circular air movement exists, the exhaled air from one person is moved to another person sitting next to him, thus creating the possibility of causing transmission of viruses.

The fan unit may be particularly suitable for round or square tables due to the round symmetrical design. In order to serve oblong tables, the entire fan unit may be raised so that the filtered air can reach the people sitting at far end of the table. In such embodiments, air deflector vanes may be provided to redirect air downward to reach people along long sides of the table. The deflector vanes may be positioned at the outer edge of the upper housing. The vanes may be made of a spring steel to prevent losing the good grip. Multiple vanes may be positioned strategically around the perimeter. These vanes are used to direct the air downward to people sitting closer to the air supply unit while other vanes not bent down provide air flow at a shallow angle to reach people at the far end of the table. While it is directing the air downward in this manner, the volume of the air is also reduced to avoid excessive air flow in that direction. The vanes are also used when more than one unit is placed end to end to cover a longer table. The vanes located facing the adjacent units can be lowered to cut down the air flow to minimize excessive interference with the air flow from the next unit. These are just some examples of how the air output may be sculpted to particularly reach and provide coverage to individuals seated around various shapes of table.

In another embodiment, separate deflectors may be provided to clip onto the outer edge of the top duct cover. The wedge shaped deflector redirects the airflow, pointing more downward accomplishing the same effect as the vanned design. Some deflectors are designed to block the air almost completely to make it suitable for end to end installation of the fan units.

In other embodiments, sliding barriers or rotational vanes may be positioned inside the duct, to control the airflow in a certain direction.

A light ring can be attached to the bottom surface of the housing. For example, this may be equipped with a series of RGB LED's to allow change of colors. A light ring can provide a desired amount of light onto the table in the color suitable for the ambient, thus functioning as a table top lamp.

Preferably, the air filter is a HEPA (high efficiency particulate air filter) filter cartridge unit readily available commercially. It is held in a filter holder and positioned directly below the fan unit. The filter holder may have two opposing latches which engage the side of the lower housing to keep it in place. The latches have a tab, which can be held by fingers. The latches can be pulled outward in opposing directions, so that the forces are balanced in such a way that the filter unit can be removed easily even when the entire device is unstable hanging from the ceiling.

In order to ensure that the replacement of the filter is done in a timely manner, the light ring at the bottom of the housing may be activated by a built-in timer and flashes or turns the color red, alerting the establishment operators that it is time to replace the filter.

The speed control switch is mounted on the side or top of the device. Depending on the size of the table, the fan speed may be adjusted to ensure that the filtered air reaches the people around the table and at the same time, it is not too strong to make it uncomfortable for the diners.

The device is preferably positioned at or above the approximate head height of persons sitting at the table. For example, it may be positioned at least approximately 2 feet above a table to provide clearance for visual contact across the persons sitting around the table. The filtered air comes out of the housing and is delivered to the persons sitting around the table, allowing them to breathe filtered air as long as they sit around the table. In some cases, one or more persons sitting around the table are infected and shed viruses. Much of these viruses are carried away from the table by the filtered air rather than lingering around. Also, some viruses which wander into the table area are sucked into the device and filtered. As a result, people who are sitting around the table are not exposed to airborne viruses even without a mask, thus keeping them safe.

At times in such environments, there is a strong draft from the building HVAC unit. If it is strong enough, this can potentially overcome the airflow from the device and result in the viruses from an infected person around the table to reach others around the table. Therefore, it may be preferred to monitor for room draft to ensure that the localized air purification system is not at cross-purposes with the HVAC draft. To overcome this concern, a piece of very flexible string may be provided at the center of the bottom filter housing and a small flat disc is attached at the bottom end approx. one foot above the table. If there is a significant draft, this disc hanging from the string will rotate and sway, indicating presence of a draft. The string is flexible enough and the disc is flat, so even when the filter unit is taken down for service, there is no danger of damage.

Alternatively, a hot wire anemometer in place of the disc may be employed to monitor the velocity of the air and activate the lamp to flash or be turned red to indicate undesirable draft.

Furthermore a microphone can be employed on the disk to monitor the sound level of the environment. When the sound level reached a certain level indicating that someone at the table is speaking too loud, it triggers the fan to increase its speed to compensate for the velocity of aerosols coming out of the mouth of that person. This minimizes the danger of aerosols reaching others on the table and infecting others.

This invention can be easily scaled up or down to suit the size of the table. As well, the shape of the housing can be adjusted to deliver the filtered air to even more localized areas if so desired. A particular version of the invention is designed to serve people sitting across a table with filtered air.

These are just some of the operational examples and considerations for an air purification unit of this type. Turning now to the drawings, details of the illustrated embodiments will be outlined.

With reference to FIG. 1 a view, 1, of an axial fan air filtration unit, 2, is shown hanging over a table, 3. The air flow, 5, into the axial fan air filtration unit, 2, is shown entering at the bottom, while the air flow, 4, is shown exiting the axial fan air filtration unit, 2, in a radial direction. Any people sitting around the table, 3, would have the filtered air flow, 4, blown at them.

Figure 2:
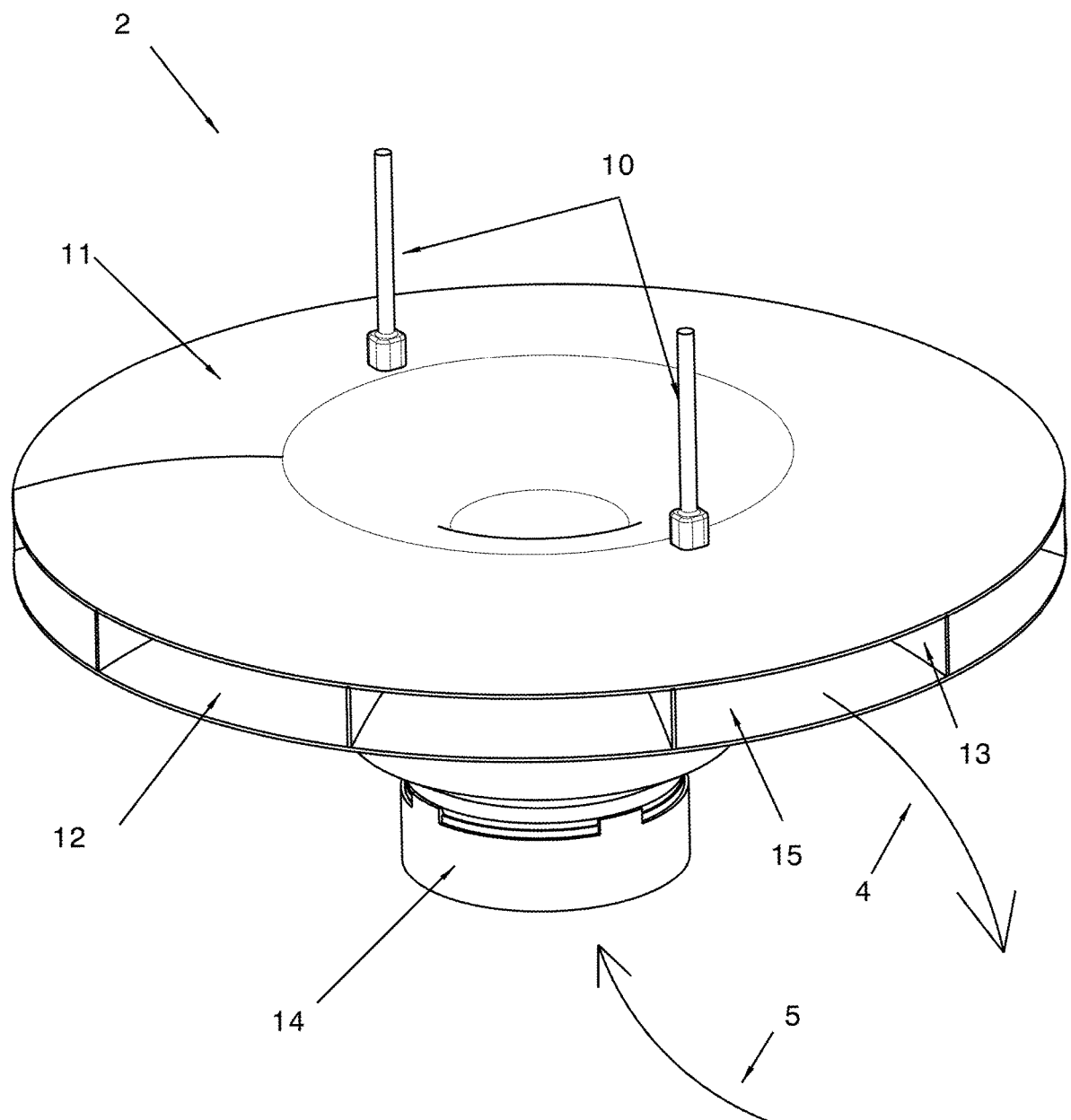
FIG. 2 is a drawing showing an upper view of the axial fan air purification unit.

With reference to FIG. 2 an upper detailed view of an axial fan air filtration unit, 2, is shown. The axial fan air filtration unit, 2, consists of the following items; hangers, 10, an upper plate, 11, a lower plate, 12, and vanes, 13. The output ducts, 15, are formed by the upper plate, 11, the lower plate, 12, and the vanes, 13. The filter holder, 14, is shown at the bottom of the axial fan air filtration unit, 2, with the air flow, 5, entering thru the bottom of the filter holder, 14. The air flow, 4, is shown exiting the axial fan air filtration unit, 2, in a radial direction from the output ducts, 15.

Figure 3:
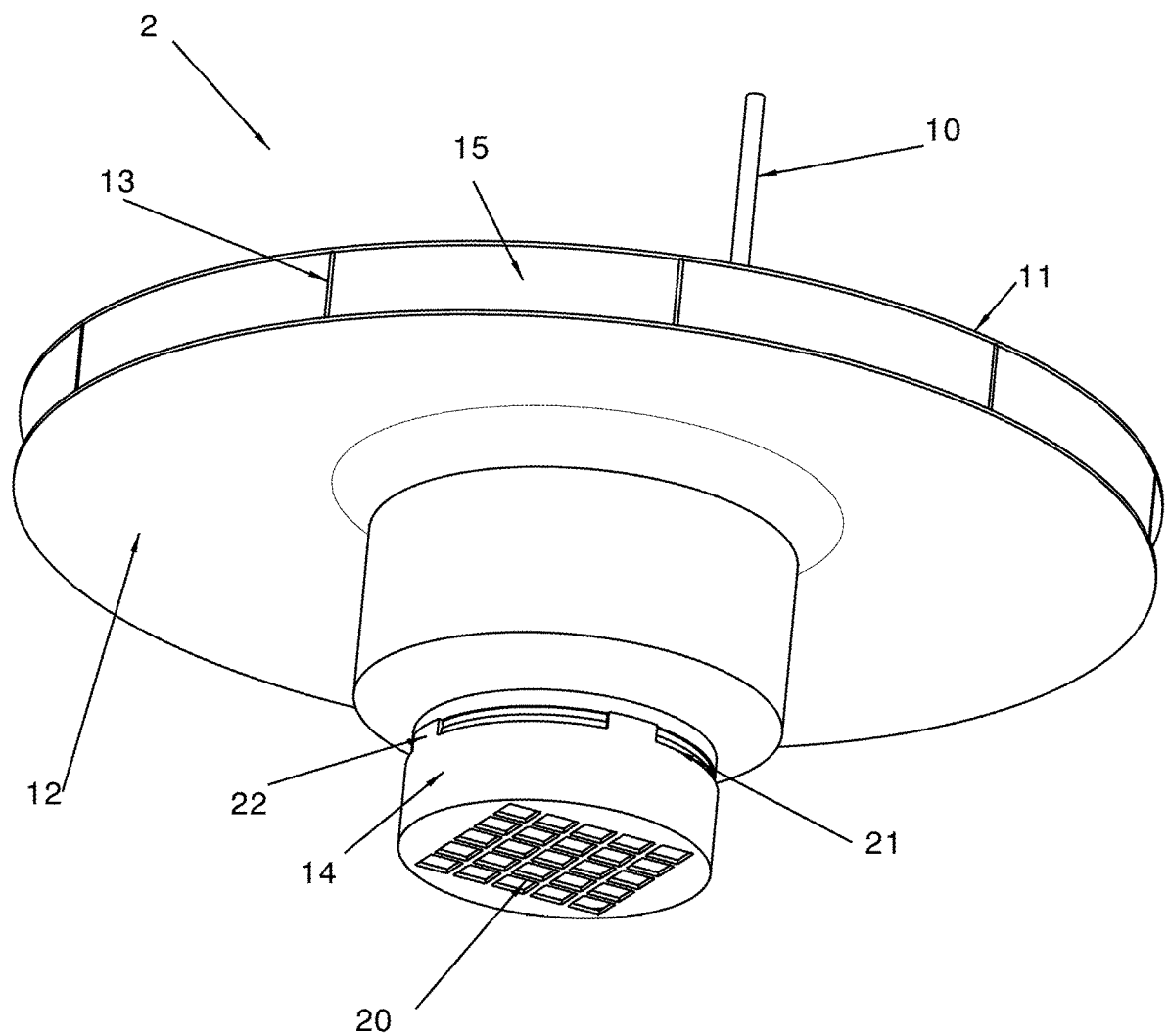
FIG. 3 is a drawing showing a lower view of the axial fan air purification unit.

With reference to FIG. 3 a lower detailed view of an axial fan air filtration unit, 2, is shown. The axial fan air filtration unit, 2, consists of the following items; hangers, 10, an upper plate, 11, a lower plate, 12, and vanes, 13. The output ducts, 15, are formed by the upper plate, 11, the lower plate, 12, and the vanes, 13. The filter holder, 14, with a grill, 20, is shown at the bottom of the axial fan air filtration unit, 2. The filter holder, 14, attaches to the bottom of the axial fan air filtration unit, 2, using the clips, 22, that engage a groove, 21. The height of the filter holder, 14, can be of any value including the situation where the filter holder, 14, is a flat plate. The attachment method of the filter holder, 14, is shown using the clips, 22, that engage a groove, 21, however many other attachment methods are possible, such as, screw threads, a bayonet mount, etc.

Figure 4:
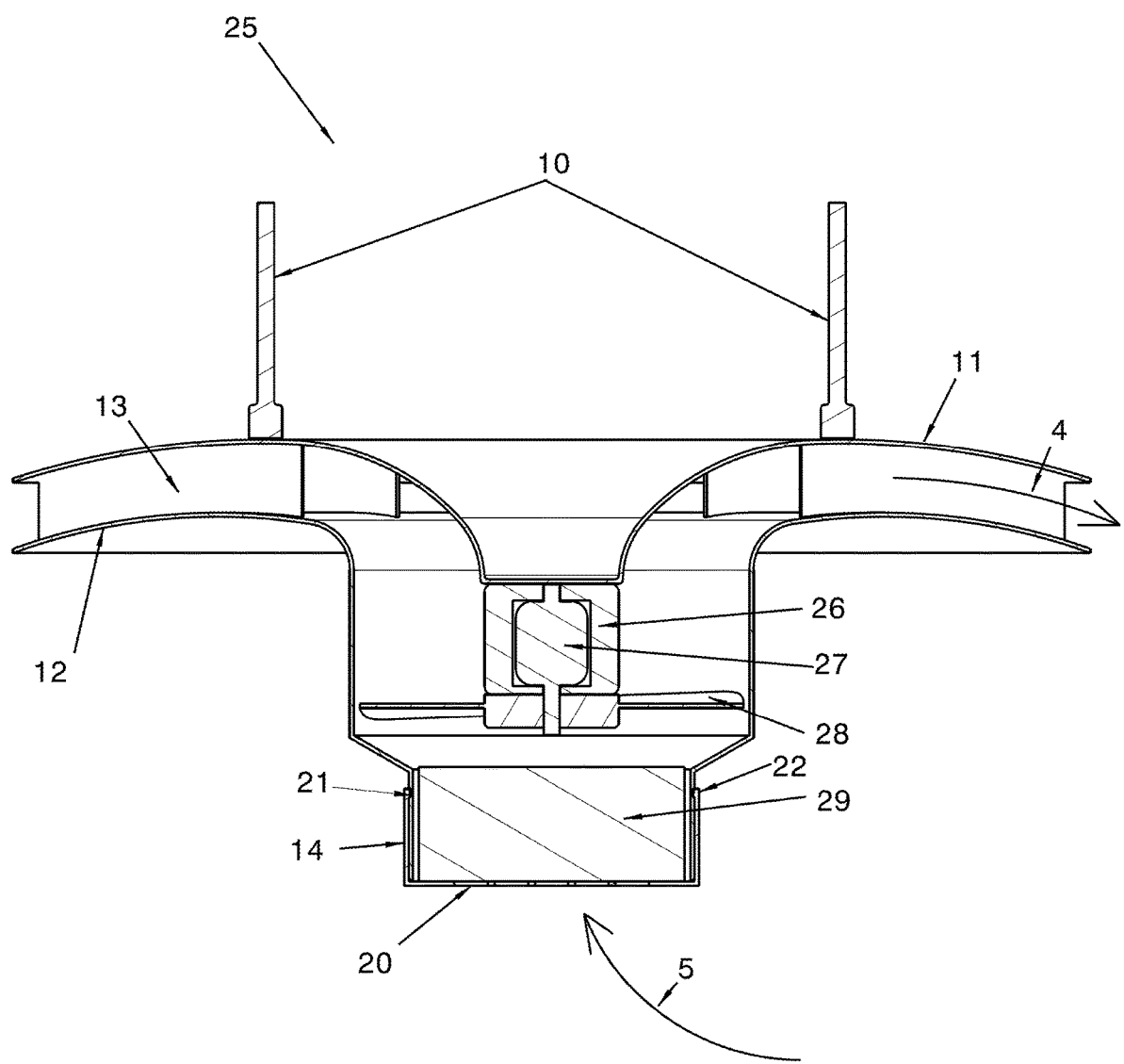
FIG. 4 is a drawing showing a cross section view of the axial fan air purification unit.

With reference to FIG. 4 a cross-section detailed view, 25, of the axial fan air filtration unit, 2, of FIG. 2 and FIG. 3 is shown. The axial fan air filtration unit, 2, consists of the following items; hangers, 10, an upper plate, 11, a lower plate, 12, and vanes, 13. The filter holder, 14, with a grill, 20, is shown at the bottom of the axial fan air filtration unit, 2. The filter holder, 14, with its grill, 20, attaches to the bottom of the axial fan air filtration unit, 2, using the clips, 22, that engage a groove, 21, and contains the air filter, 29. The air filter, 29, can filter out viruses including COVID-19 as long as it can catch particles of a small enough size, HEPA filters rated as H13 or higher can do this. Also shown in this figure are: the motor housing, 26, and the motor rotor, 27, which is attached to the axial fan, 28. The air flow, 5, into the filter, 29, through the grill, 20, as well as the air flow, 4, leaving the axial fan air filtration unit, 2, is shown.

HEPA filters are preferred for the embodiments of the air purification systems described herein. There are several types of HEPA filters. The most typical ones used for portable and small filter units are round with filter membranes folded multiple times to provide a large surface area. Another type uses a corrugated filter membrane which is wrapped around in a cylindrical form. Another type uses square filter panels with a membrane folded many times. Various types of filter media could be used and/or adapted for the present invention.

Figure 5:
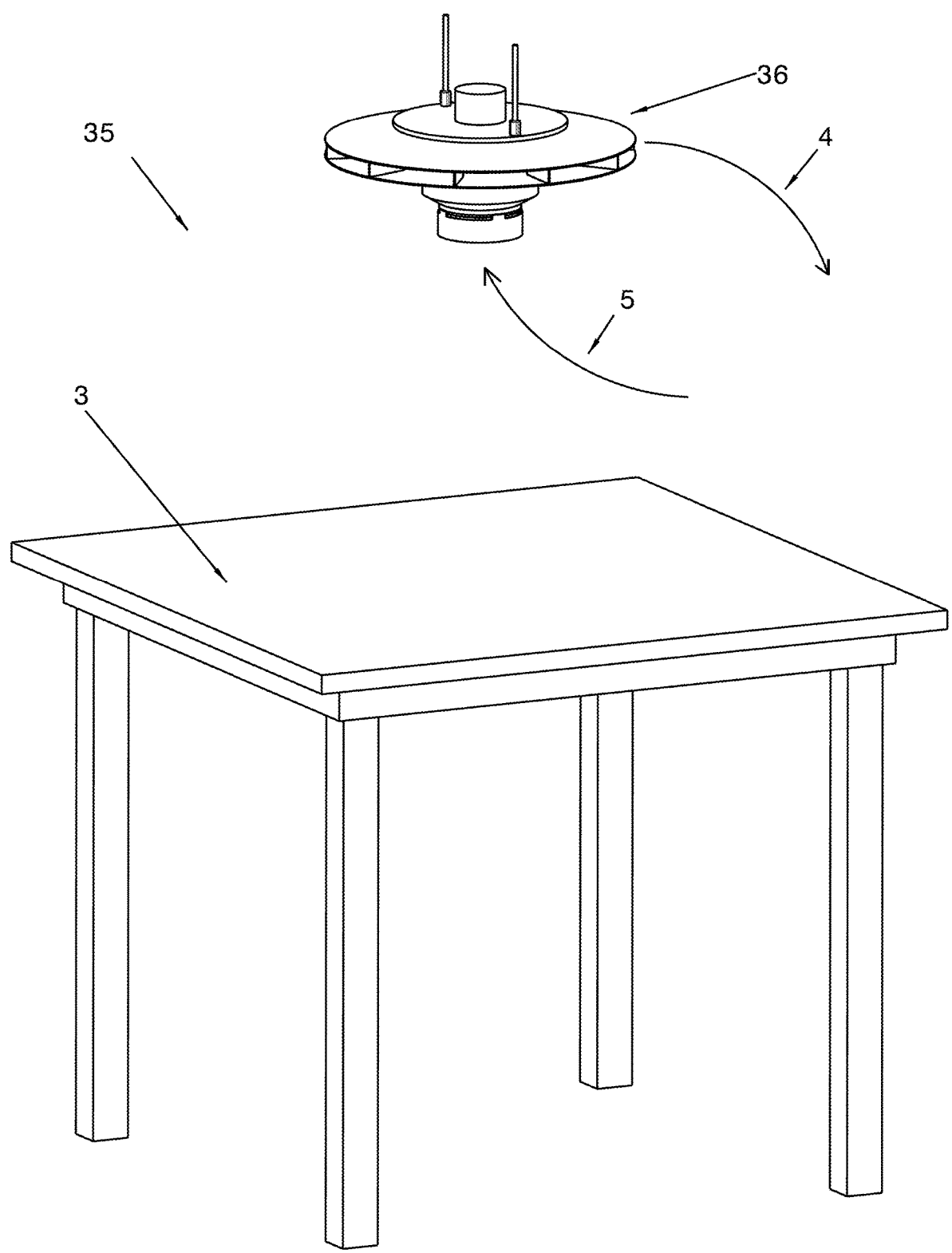
FIG. 5 is a drawing showing an embodiment of a radial fan air purification unit hanging over a table.

With reference to FIG. 5 a view, 35, of a radial fan air filtration unit, 36, is shown hanging over a table, 3. The air flow, 5, into the radial fan air filtration unit, 2, is shown entering at the bottom, while the air flow, 4, is shown exiting the radial fan air filtration unit, 36, in a radial direction. Any people sitting around the table, 3, would have the filtered air flow, 4, blown at them.

Figure 6:
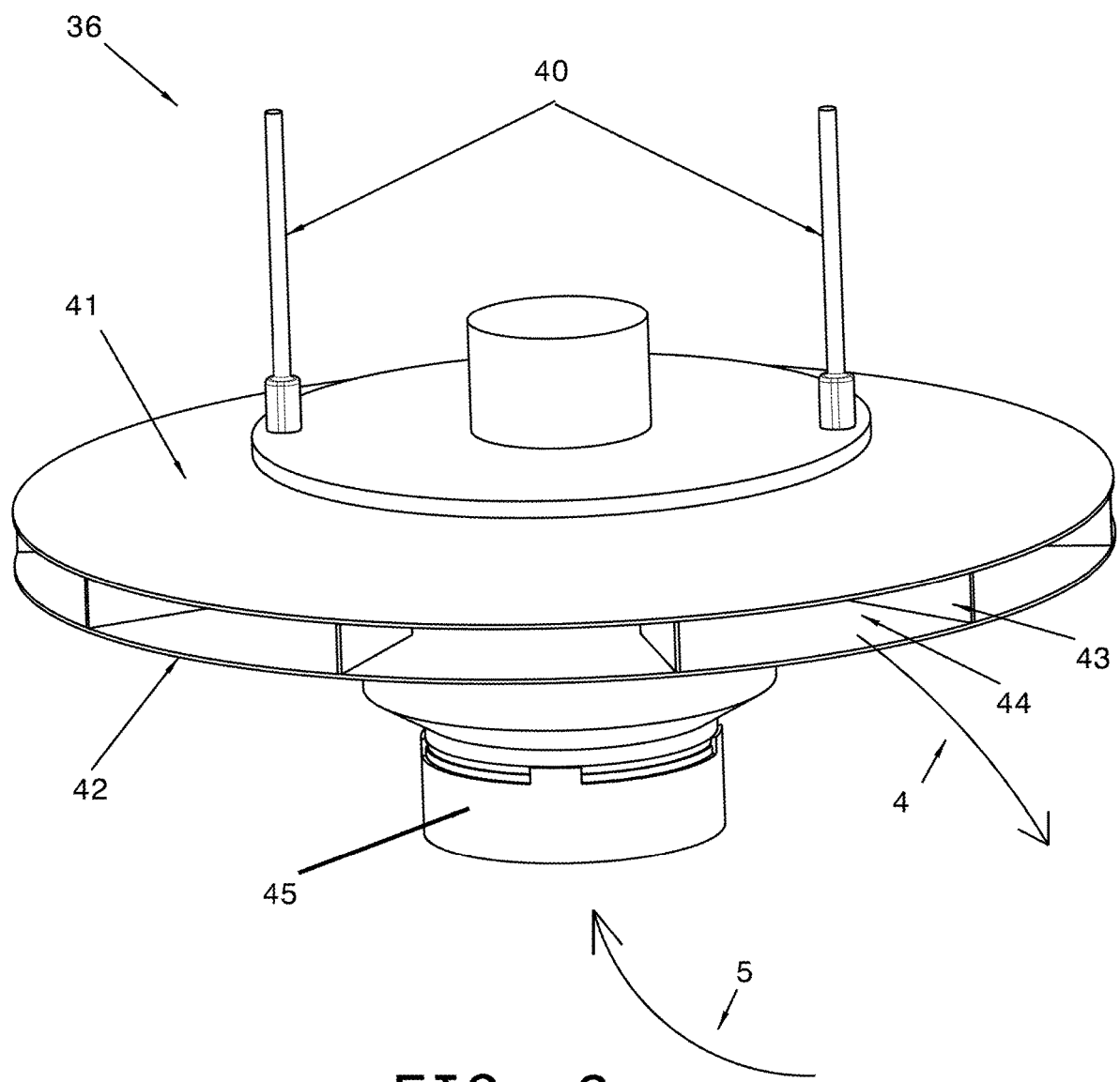
FIG. 6 is a drawing showing an upper view of the radial fan air purification unit.

With reference to FIG. 6 an upper detailed view of a radial fan air filtration unit, 36, is shown. The radial fan air filtration unit, 36, consists of the following items; hangers, 40, an upper plate, 41, a lower plate, 42, and vanes, 43. The output ducts, 44, are formed by the upper plate, 41, the lower plate, 42, and the vanes, 43. The filter holder, 45, is shown at the bottom of the radial fan air filtration unit, 36, with the air flow, 5, entering thru the bottom of the filter holder, 45. The air flow, 4, is shown exiting the radial fan air filtration unit, 36, in a radial direction from the output ducts, 44.

Figure 7:
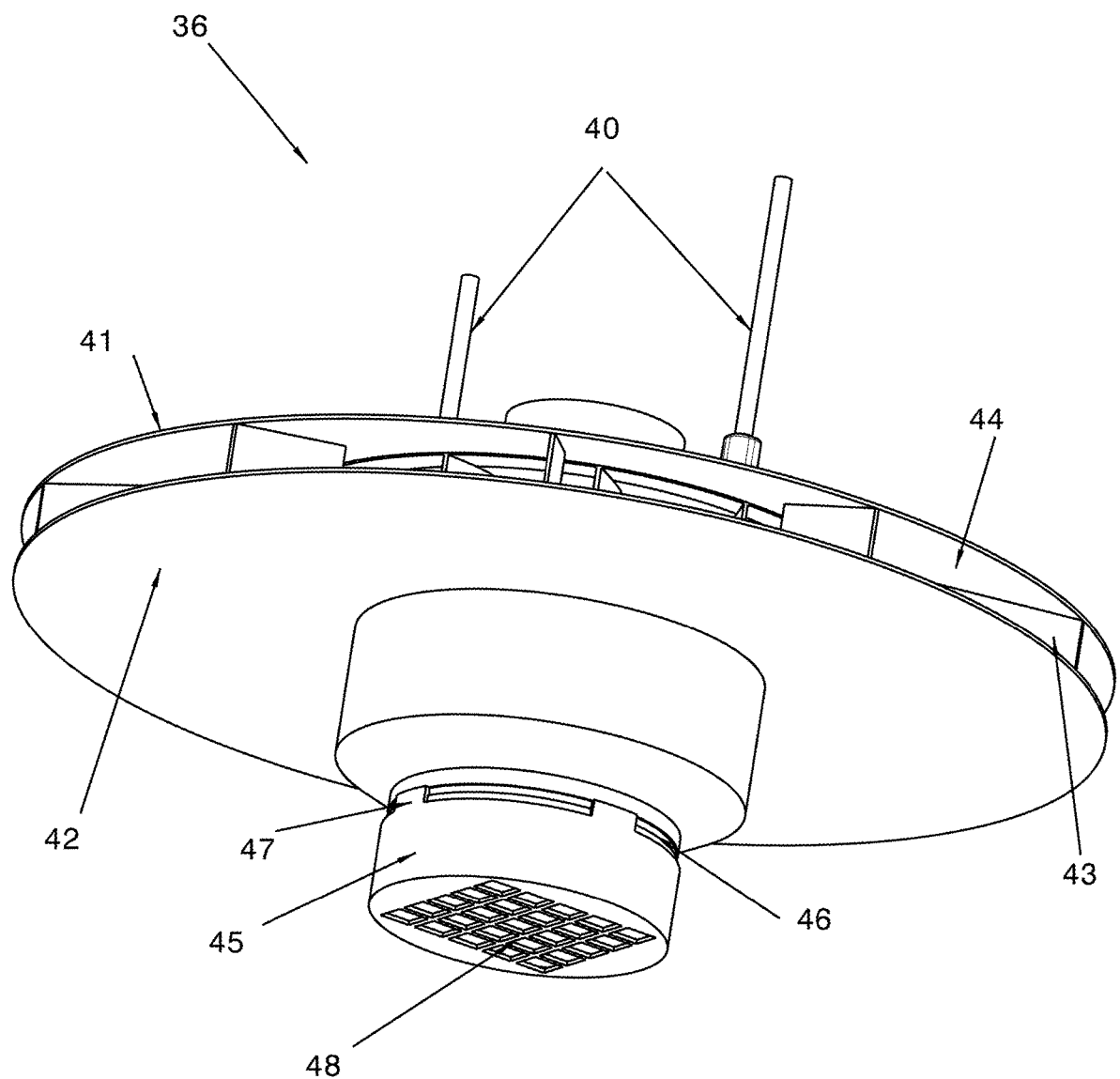
FIG. 7 is a drawing showing a lower view of the radial fan air purification unit.

With reference to FIG. 7 a lower detailed view of a radial fan air filtration unit, 36, is shown. The radial fan air filtration unit, 36, consists of the following items; hangers, 40, an upper plate, 41, a lower plate, 42, and vanes, 43. The output ducts, 44, are formed by the upper plate, 41, the lower plate, 42, and the vanes, 43. The filter holder, 45, with a grill, 48, is shown at the bottom of the radial fan air filtration unit, 36. The filter holder, 45, attaches to the bottom of the radial fan air filtration unit, 36, using the clips, 47, that engage a groove, 46. The height of the filter holder, 45, can be of any value including the situation where the filter holder, 45, is a flat plate. The attachment method of the filter holder, 45, is shown using the clips, 47, that engage a groove, 46, however many other attachment methods are possible, such as, screw threads, a bayonet mount, etc.

Figure 8:
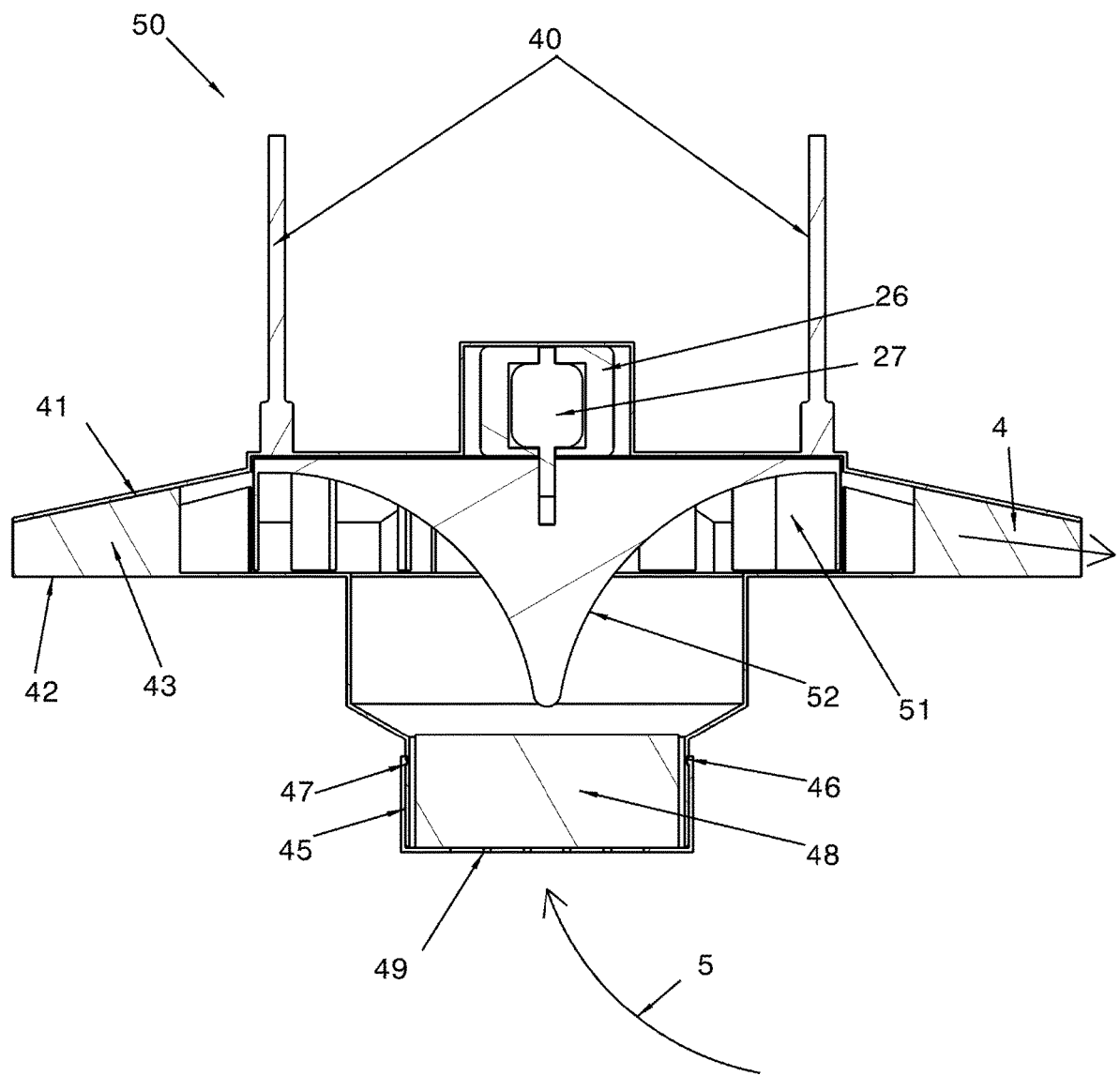
FIG. 8 is a drawing showing a cross section view of the radial fan air purification unit.

With reference to FIG. 8 a cross-section detailed view, 50, of the radial fan air filtration unit, 36, of FIG. 6 and FIG. 7 is shown. The radial fan air filtration unit, 36, consists of the following items; hangers, 40, an upper plate, 41, a lower plate, 42, and vanes, 43. The filter holder, 45, with a grill, 49, is shown at the bottom of the radial fan air filtration unit, 36. The filter holder, 45, with its grill, 49, attaches to the bottom of the radial fan air filtration unit, 36, using the clips, 47, that engage a groove, 46, and contains the air filter, 48. The air filter, 48, can filter out viruses including COVID-19 as long as it can catch particles of a small enough size, HEPA filters rated as H13 or higher can do this. Also shown in this figure are: the motor housing, 26, and the motor rotor, 27, which is attached to the radial fan assembly consisting of the vanes, 51. And the air flow guide, 52. The air flow, 5, into the filter, 48, through the grill, 49, as well as the air flow, 4, leaving the axial fan air filtration unit, 36, is shown.

Figure 9:
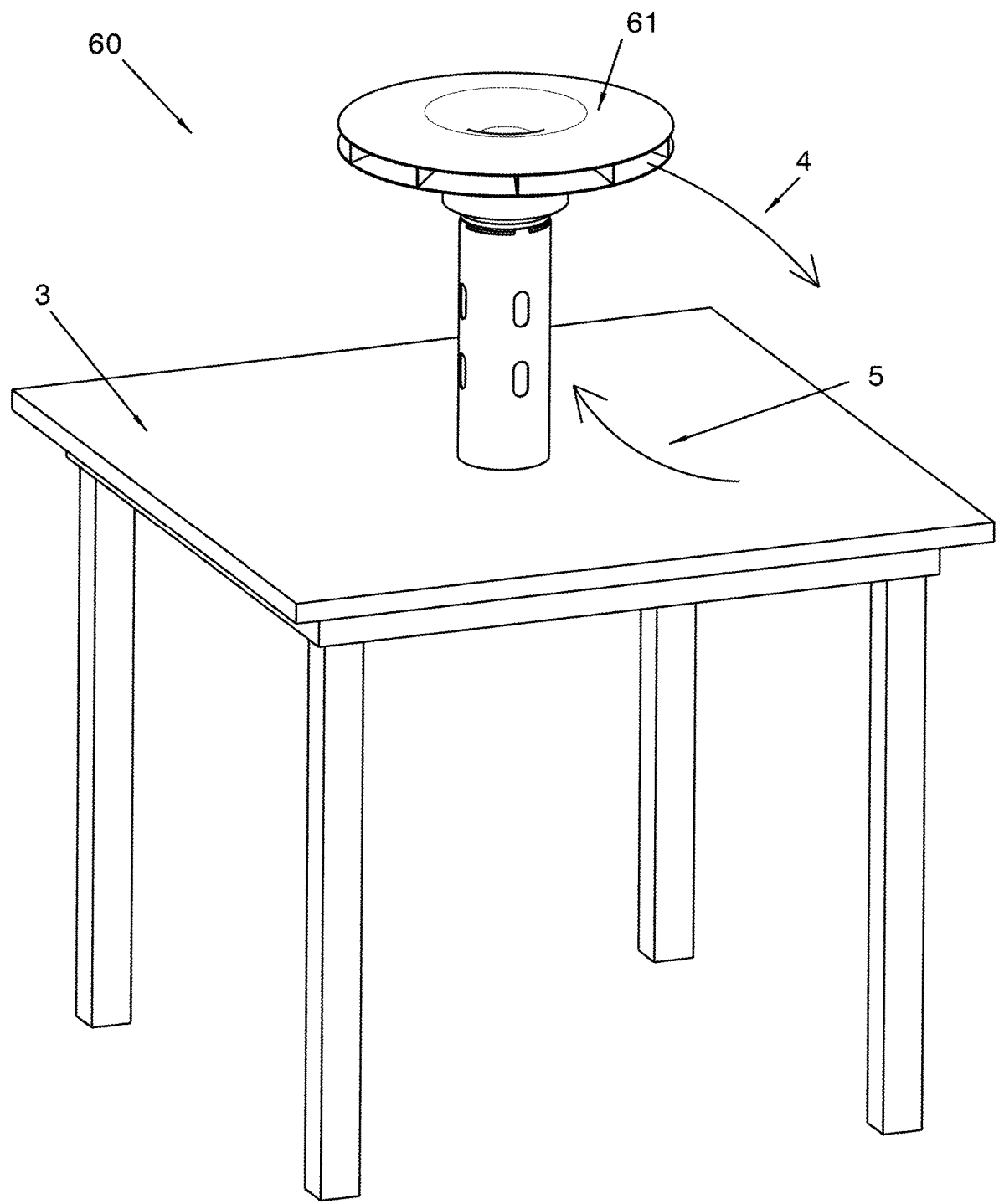
FIG. 9 is a drawing showing the axial fan air purification unit sitting on a table.

With reference to FIG. 9 a view, 60, of an axial fan air filtration unit, 61, is shown sitting on a table, 3. The air flow, 5, into the axial fan air filtration unit, 61, is shown entering at the bottom, while the air flow, 4, is shown exiting the axial fan air filtration unit, 61, in a radial direction. Any people sitting around the table, 3, would have the filtered air flow, 4, blown at them.

Figure 10:
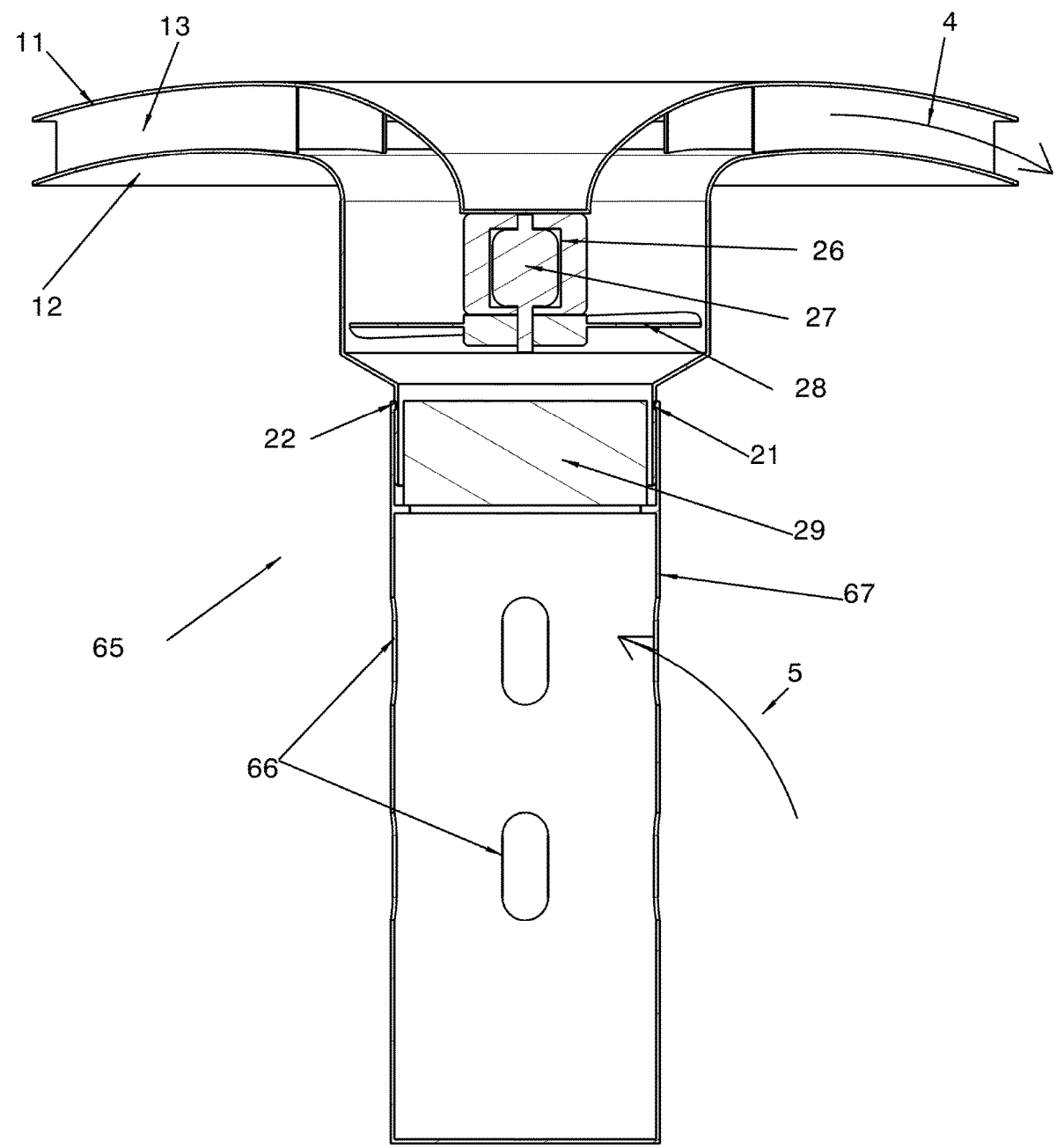
FIG. 10 is a drawing showing a cross section view of the axial fan air purification unit of FIG. 9.

With reference to FIG. 10 a cross-section detailed view, 65, of the axial fan air filtration unit, 61, of FIG. 9 is shown. The axial fan air filtration unit, 61, consists of the following items; an upper plate, 11, a lower plate, 12, and vanes, 13, and a filter holder/stand, 67. The filter/stand holder, 67, with air intake holes, 66, is shown at the bottom of the axial fan air filtration unit, 61. The filter holder/stand, 67, with its air intake holes, 66, attaches to the bottom of the axial fan air filtration unit, 61, using the clips, 22, that engage a groove, 21, and contains the air filter, 29. The air filter, 29, can filter out viruses including COVID-19 as long as it can catch particles of a small enough size, HEPA filters rated as H13 or higher can do this. Also shown in this figure are: the motor housing, 26, and the motor rotor, 27, which is attached to the axial fan, 28. The air flow, 5, into the filter, 29, through the air intake holes, 66, as well as the air flow, 4, leaving the axial fan air filtration unit, 61, is shown.

Figure 11:
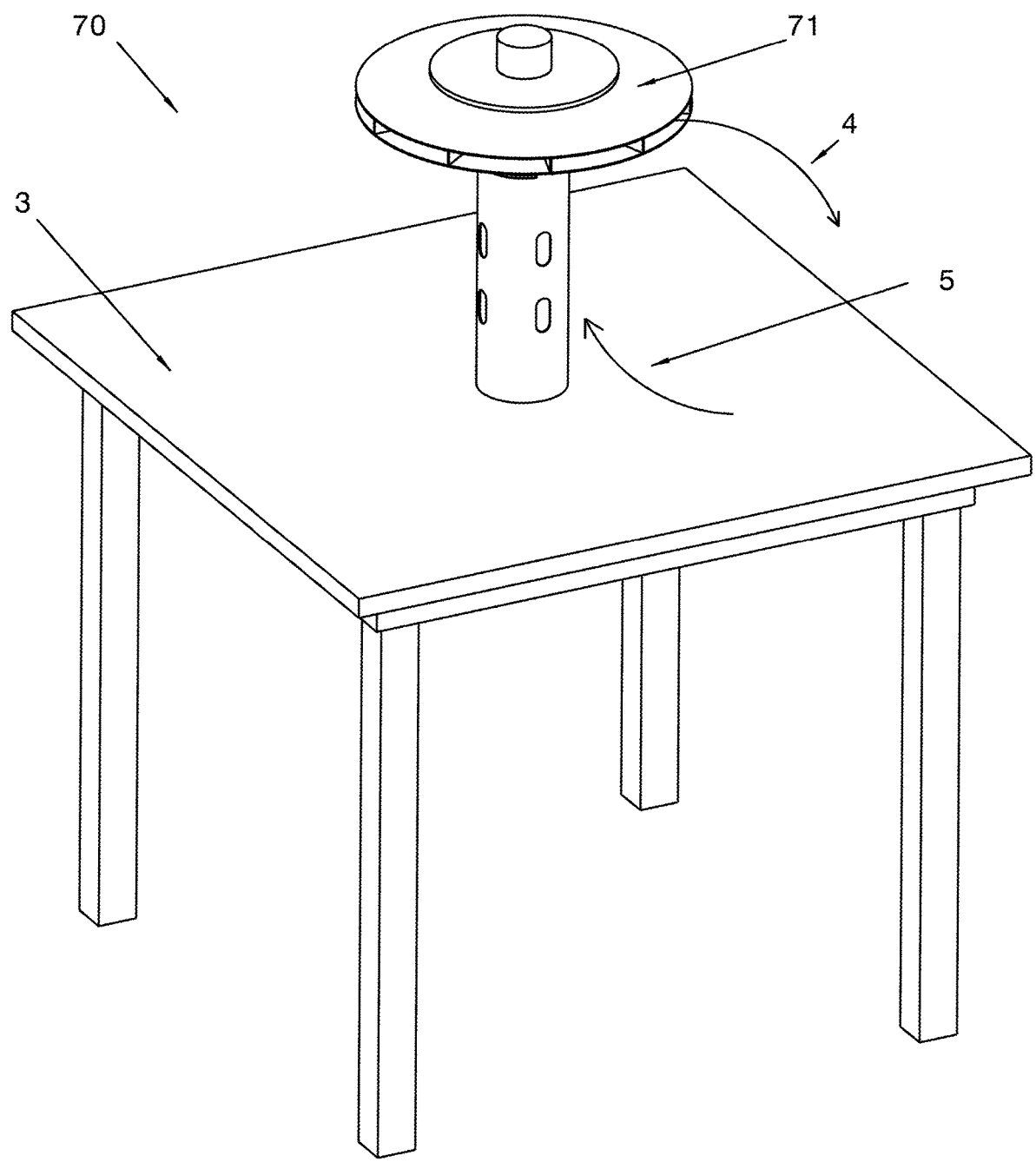
FIG. 11 is a drawing showing the radial fan air purification unit sitting on a table.

With reference to FIG. 11 a view, 70, of a radial fan air filtration unit, 71, is shown sitting on a table, 3. The air flow, 5, into the radial fan air filtration unit, 71, is shown entering at the bottom, while the air flow, 4, is shown exiting the radial fan air filtration unit, 71, in a radial direction. Any people sitting around the table, 3, would have the filtered air flow, 4, blown at them.

Figure 12:
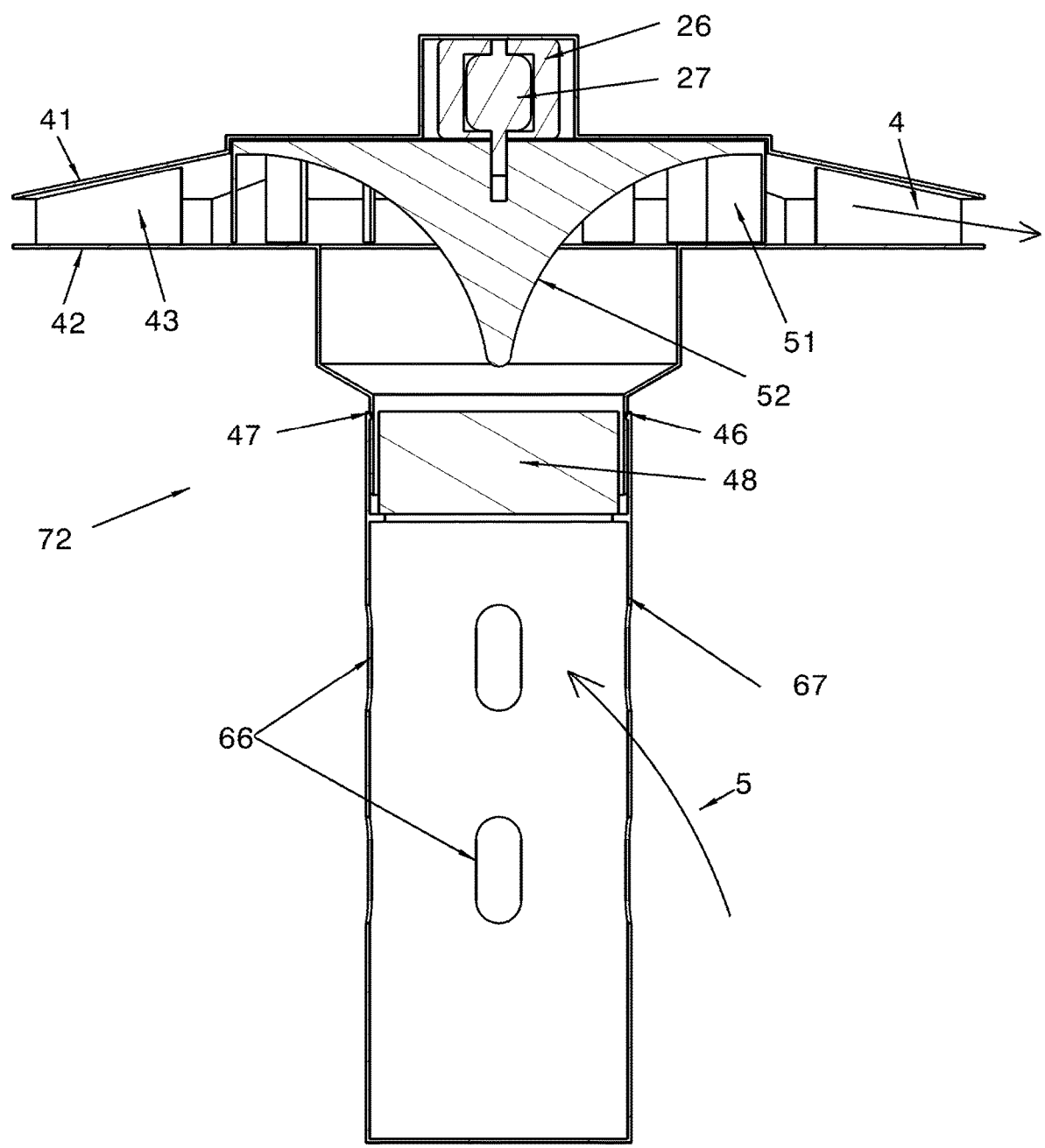
FIG. 12 is a drawing showing a cross section view of the radial fan air purification of FIG. 11.

With reference to FIG. 12 a cross-section detailed view, 72, of the radial fan air filtration unit, 71, of FIG. 11 is shown. The radial fan air filtration unit, 71, consists of the following items; an upper plate, 41, a lower plate, 42, and vanes, 43, and a filter holder/stand, 67. The filter/stand holder, 67, with air intake holes, 66, is shown at the bottom of the radial fan air filtration unit, 71. The filter holder/stand, 67, with its air intake holes, 66, attaches to the bottom of the radial fan air filtration unit, 71, using the clips, 47, that engage a groove, 46, and contains the air filter, 48. The air filter, 48, can filter out viruses including COVID-19 as long as it can catch particles of a small enough size, HEPA filters rated as H13 or higher can do this. Also shown in this figure are: the motor housing, 26, and the motor rotor, 27, which is attached to the radial fan assembly consisting of the vanes, 51, and the air flow guide, 52. The air flow, 5, into the filter, 48, through the air intake holes, 66, as well as the air flow, 4, leaving the axial fan air filtration unit, 71, is shown.

Figure 13:
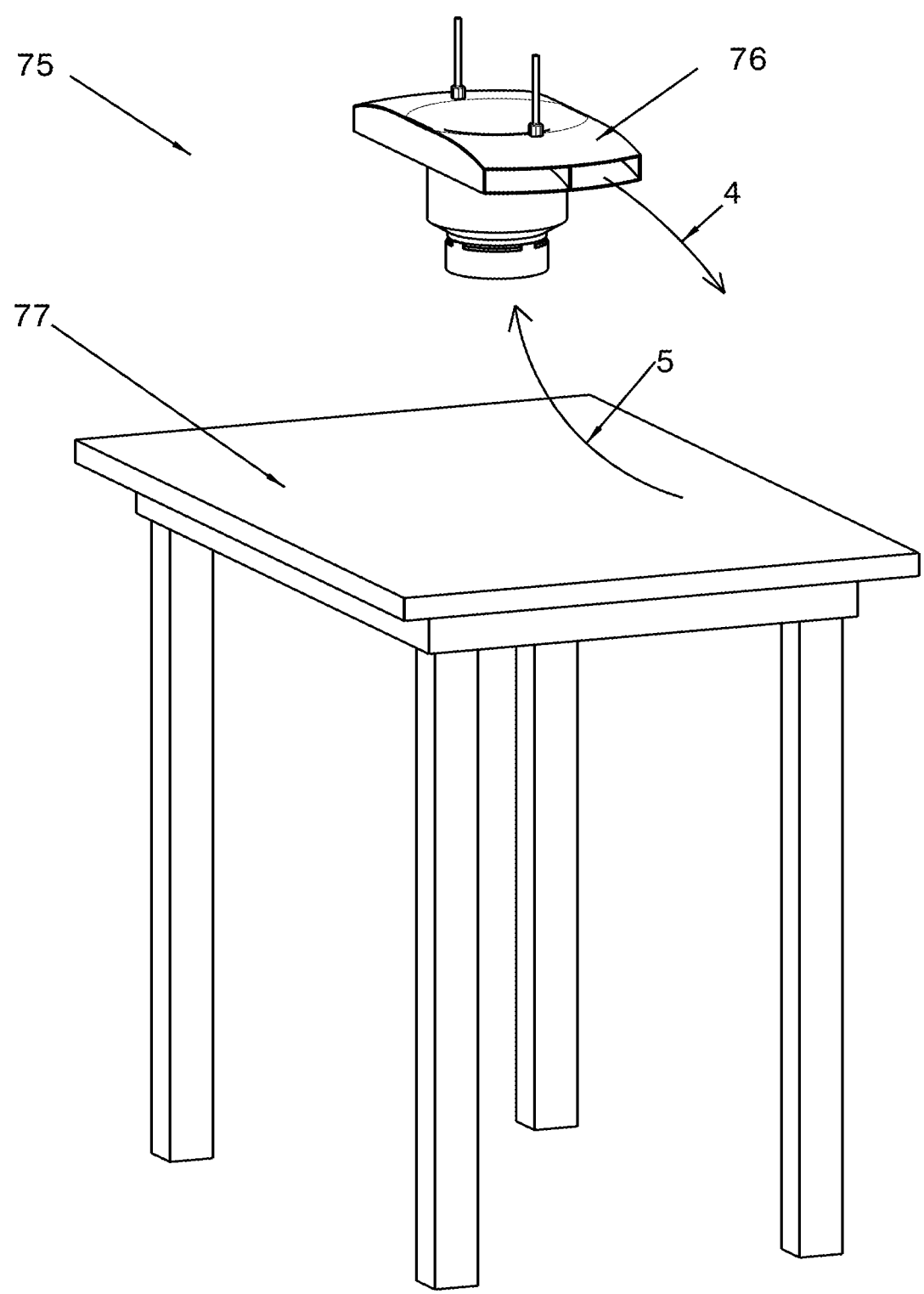
FIG. 13 is a drawing showing an embodiment of a two directional axial fan air purification unit hanging over a table.

With reference to FIG. 13 a view, 75, of an axial fan air filtration unit, 78, is shown hanging over a two person table, 77. The air flow, 5, into the axial fan air filtration unit, 78, is shown entering at the bottom, while the air flow, 4, is shown exiting the axial fan air filtration unit, 76, in a radial direction. Two people sitting across the table, 77, would have the filtered air flow, 4, blown at them.

Figure 14:
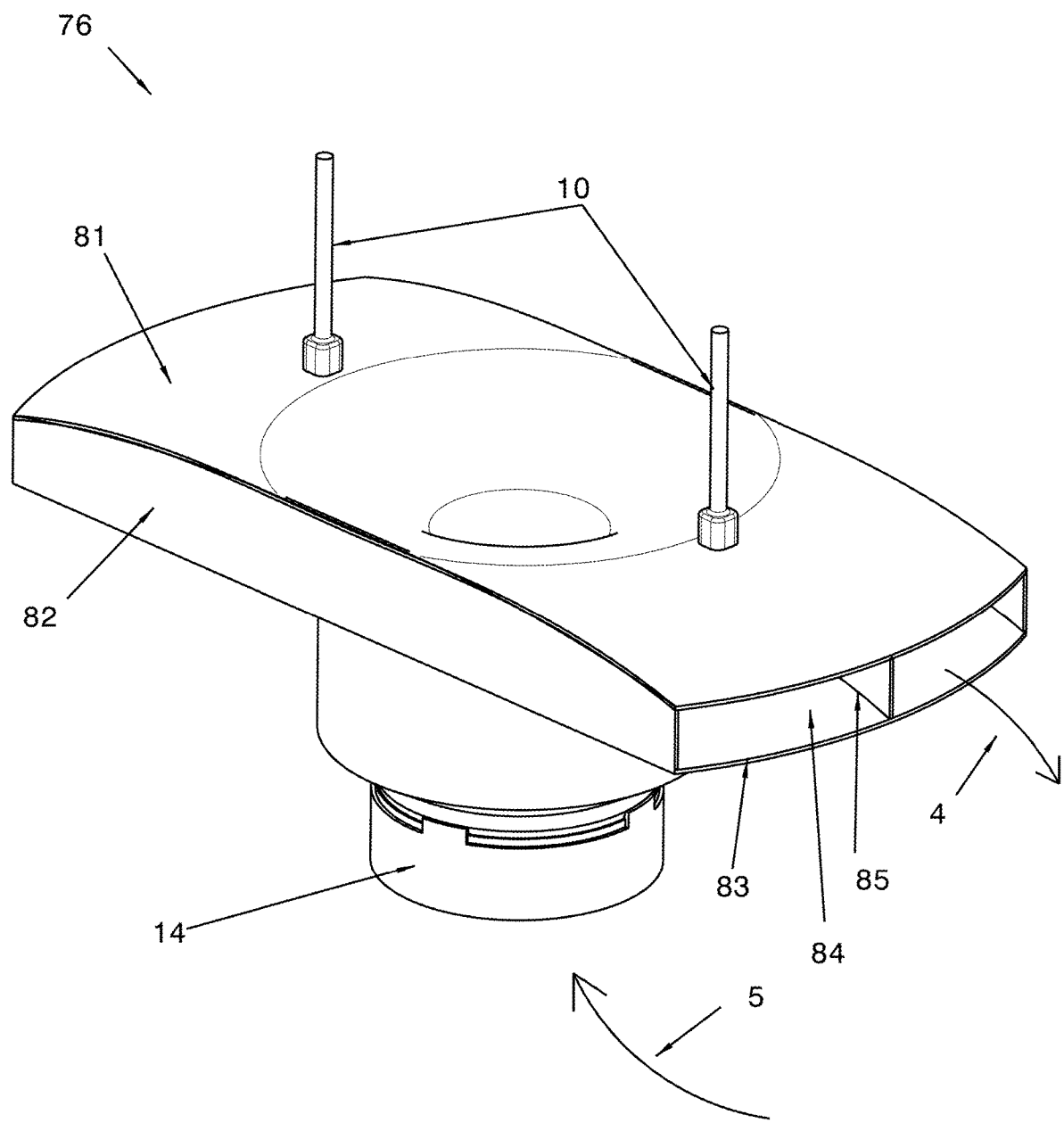
FIG. 14 is a drawing showing a view of the two directional axial fan air purification unit.

With reference to FIG. 14 an upper detailed view of the axial fan air filtration unit, 78 of FIG. 13 is shown. The axial fan air filtration unit, 78, consists of the following items; hangers, 10, an upper plate, 81, a side plates, 82, a lower plate, 83, and the vanes, 85. The output ducts, 84, are formed by the upper plate, 81, the side plates, 82, lower plate, 83, and the vanes, 85. The filter holder, 14, is shown at the bottom of the axial fan air filtration unit, 76, with the air flow, 5, entering thru the bottom of the filter holder, 14. The air flow, 4, is shown exiting the axial fan air filtration unit, 76, in a radial direction from the output ducts, 84.

Figure 15:
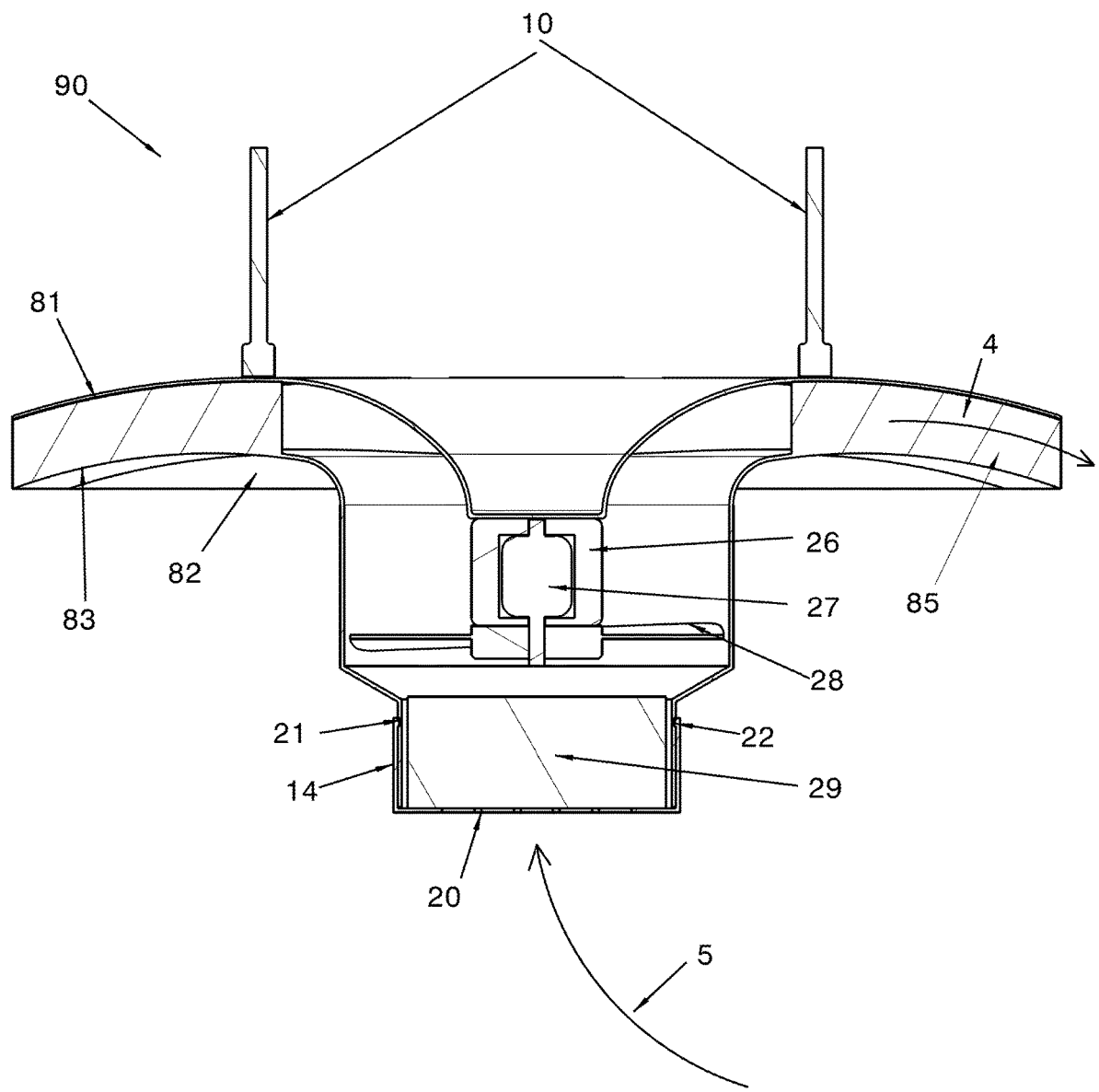
FIG. 15 is a drawing showing a cross section view of the two directional fan air purification unit.

With reference to FIG. 15 a cross-section detailed view, 90, of the axial fan air filtration unit, 76, of FIG. 14 is shown. The axial fan air filtration unit, 76, consists of the following items; hangers, 10, an upper plate, 81, a lower plate, 82, side plate, 85, and vanes, 83. The filter holder, 14, with a grill, 20, is shown at the bottom of the axial fan air filtration unit, 76. The filter holder, 14, with its grill, 20, attaches to the bottom of the axial fan air filtration unit, 76, using the clips, 22, that engage a groove, 21, and contains the air filter, 29. The air filter, 29, can filter out viruses including COVID-19 as long as it can catch particles of a small enough size, HEPA filters rated as H13 or higher can do this. Also shown in this figure are: the motor housing, 26, and the motor rotor, 27, which is attached to the axial fan, 28. The air flow, 5, into the filter, 29, through the grill, 20, as well as the air flow, 4, leaving the axial fan air filtration unit, 76, is shown.

Figure 16:
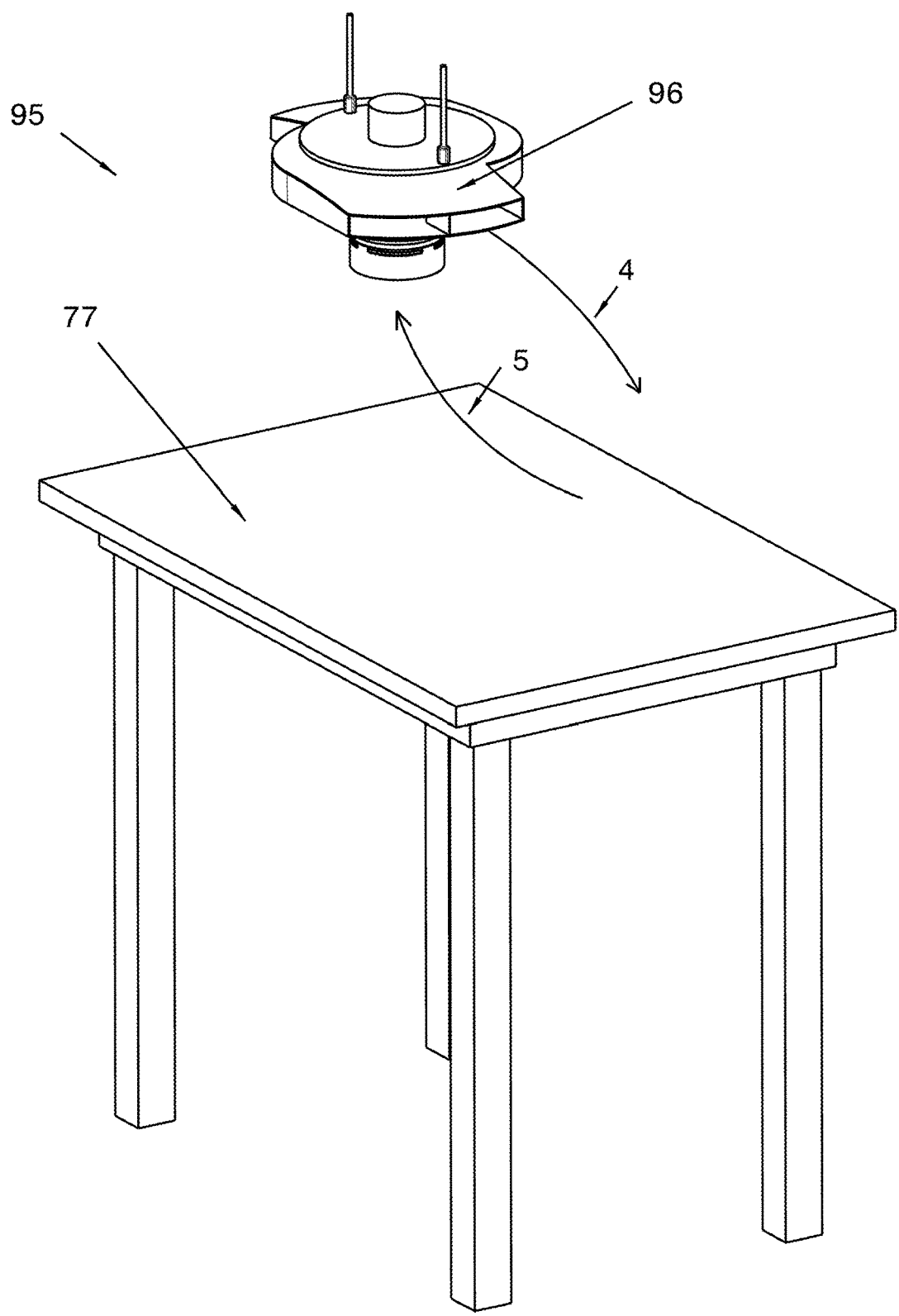
FIG. 16 is a drawing showing the two directional radial fan air purification unit hanging over a table.

With reference to FIG. 16 a view, 95, of a radial fan air filtration unit, 96, is shown hanging over a two person table, 77. The air flow, 5, into the radial fan air filtration unit, 96, is shown entering at the bottom, while the air flow, 4, is shown exiting the radial fan air filtration unit, 96, in a radial direction. Two people sitting across the table, 77, would have the filtered air flow, 4, blown at them.

Figure 17:
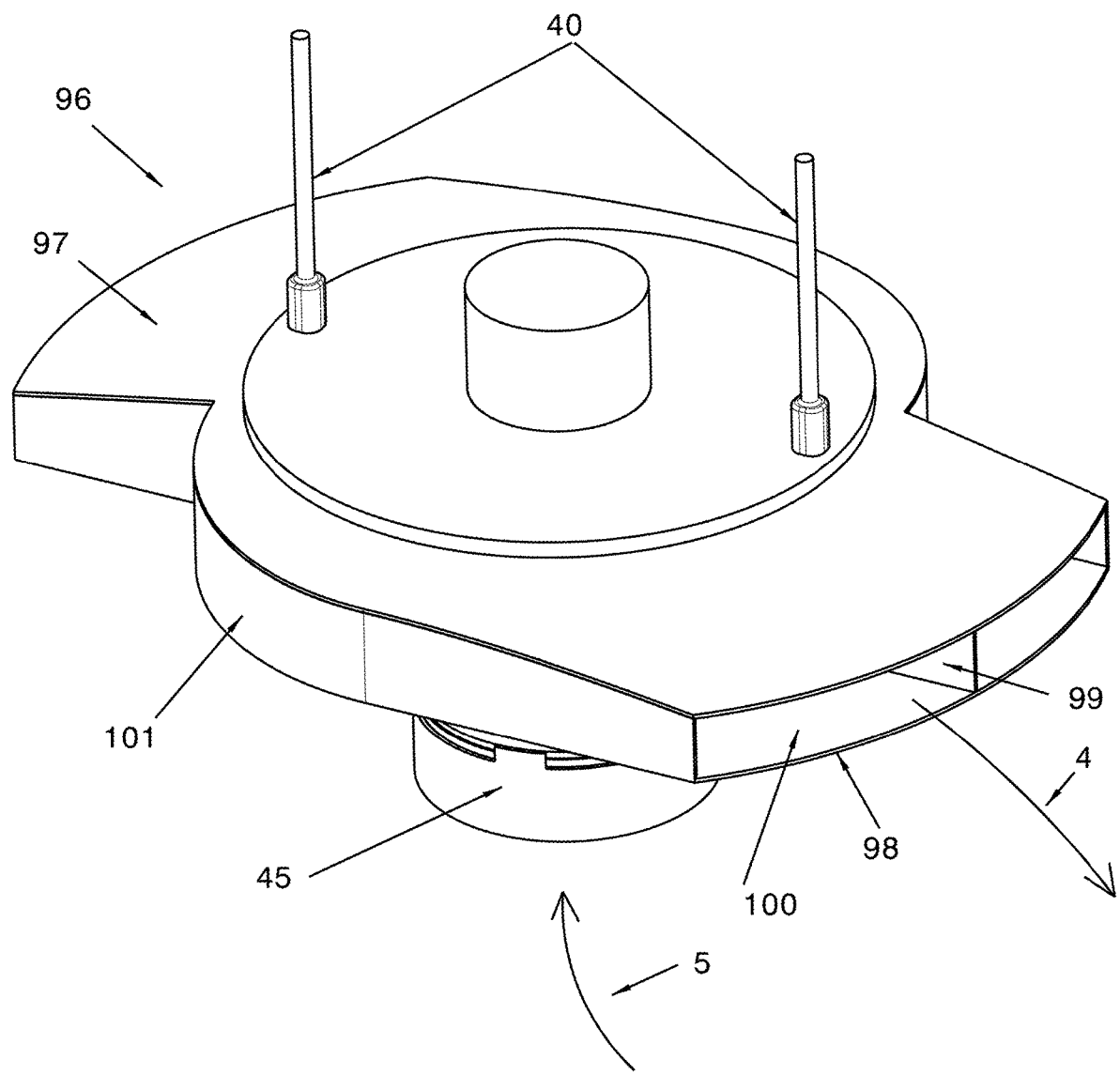
FIG. 17 is a drawing showing a view of the two directional radial fan air purification unit.

With reference to FIG. 17 an upper detailed view of the radial fan air filtration unit, 96 of FIG. 16 is shown. The radial fan air filtration unit, 96, consists of the following items; hangers, 40, an upper plate, 97, a side plates, 101, a lower plate, 98, and the vanes, 99. The output ducts, 100, are formed by the upper plate, 97, the side plates, 101, lower plate, 98, and the vanes, 99. The filter holder, 45, is shown at the bottom of the radial fan air filtration unit, 96, with the air flow, 5, entering thru the bottom of the filter holder, 45. The air flow, 4, is shown exiting the radial fan air filtration unit, 96, in a radial direction from the output ducts, 100.

Figure 18:
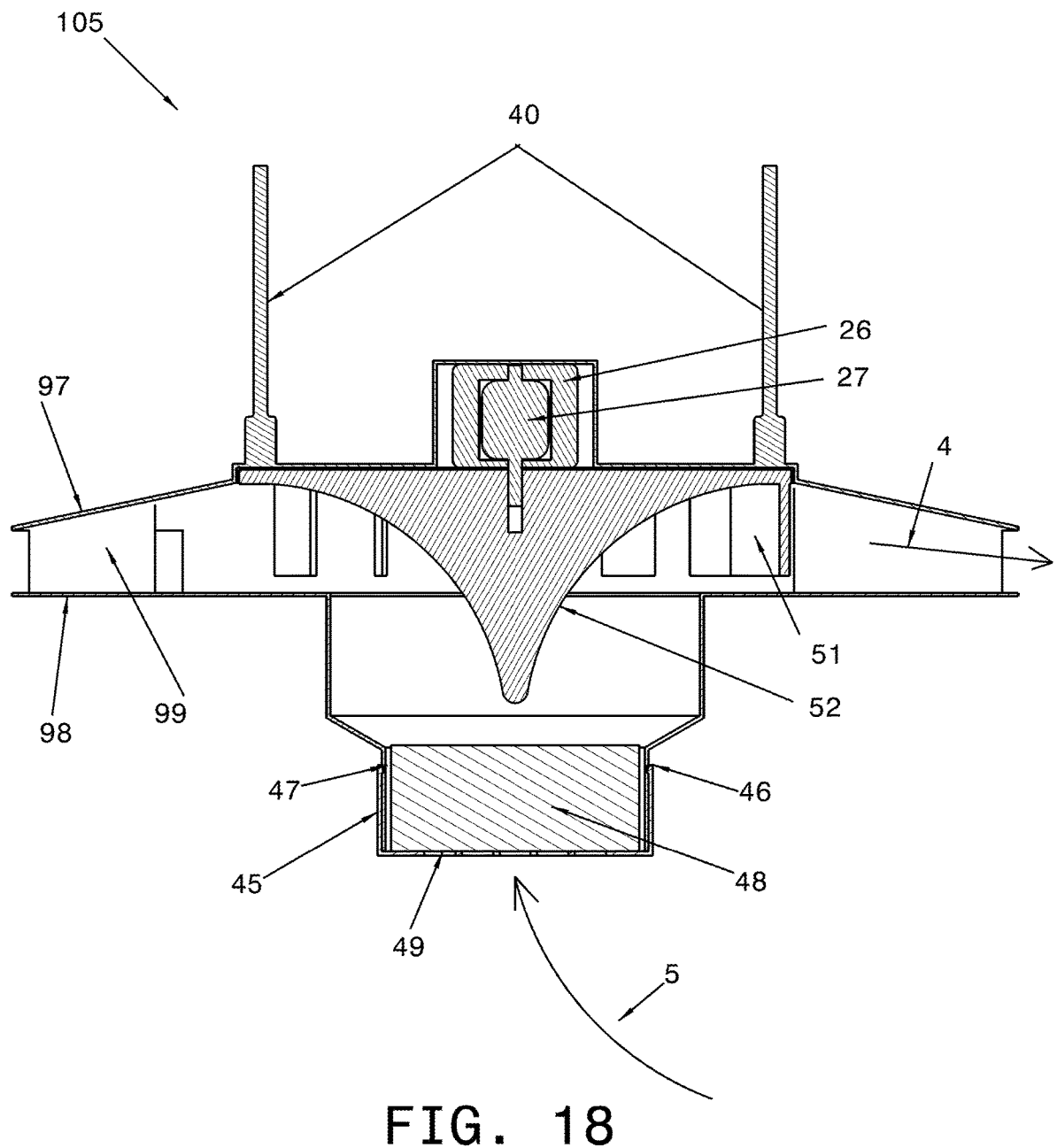
FIG. 18 is a drawing showing a cross section view of the two directional radial fan air purification unit.

With reference to FIG. 18 a cross-section detailed view, 105, of the radial fan air filtration unit, 96, of FIG. 17 is shown. The radial fan air filtration unit, 96, consists of the following items; hangers, 40, an upper plate, 97, a lower plate, 98, and vanes, 99. The filter holder, 45, with a grill, 49, is shown at the bottom of the radial fan air filtration unit, 96. The filter holder, 45, with its grill, 49, attaches to the bottom of the radial fan air filtration unit, 96, using the clips, 47, that engage a groove, 46, and contains the air filter, 48. The air filter, 48, can filter out viruses including COVID-19 as long as it can catch particles of a small enough size, HEPA filters rated as H13 or higher can do this. Also shown in this figure are: the motor housing, 26, and the motor rotor, 27, which is attached to the radial fan assembly consisting of the vanes, 51, and the air flow guide, 52. The air flow, 5, into the filter, 48, through the grill, 49, as well as the air flow, 4, leaving the radial fan air filtration unit, 96, is shown.

Figure 19:
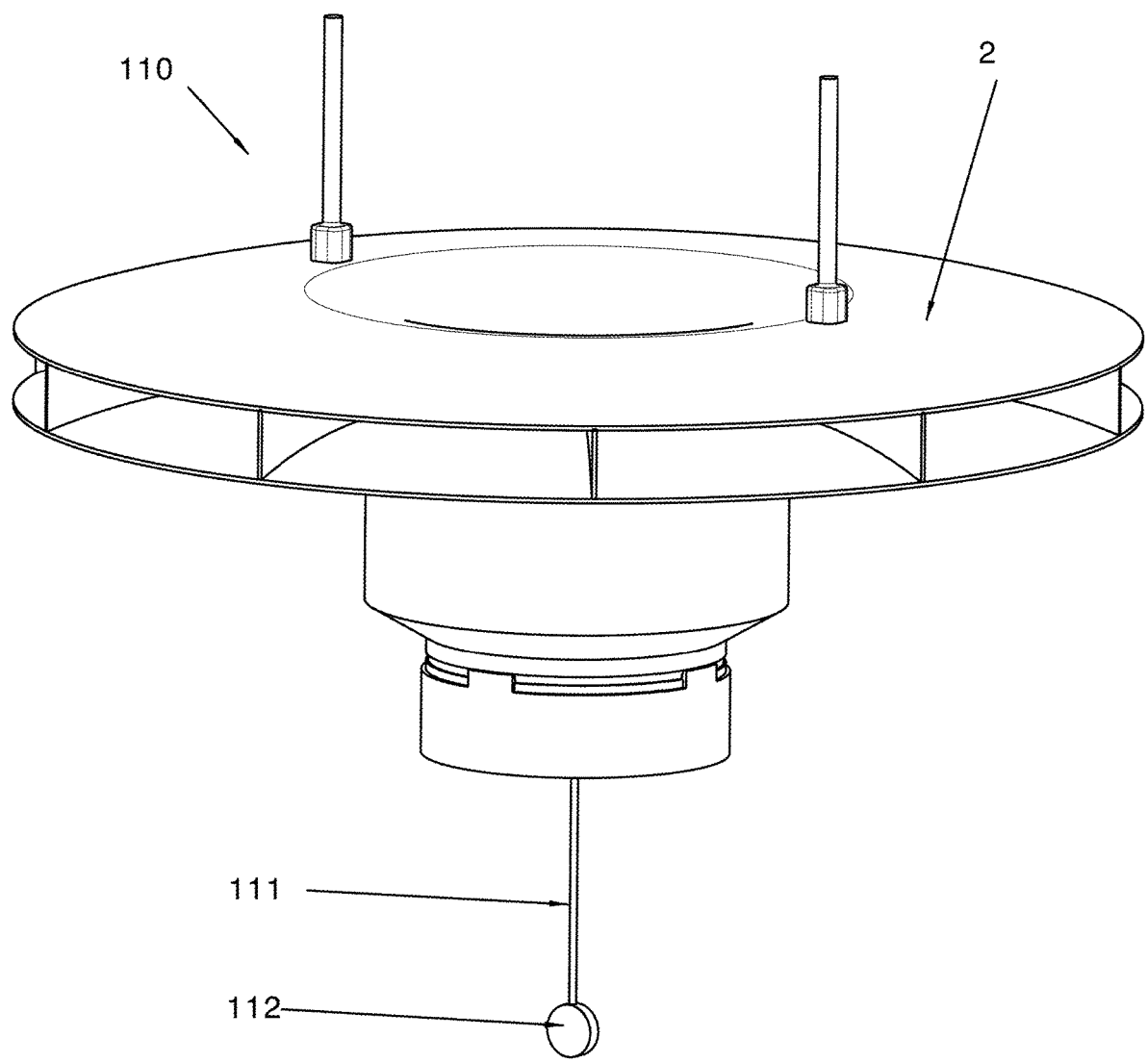
FIG. 19 is a drawing showing an embodiment using a draft detection disc.

With reference to FIG. 19 a view, 110, of an axial fan air filtration unit, 2, is shown along with a draft indication device consisting of a disc, 112, hanging from a thread, 111, that is attached to the bottom of the axial fan air filtration unit, 2. The presence of an air draft will cause the disc, 112, to move to one side, giving a visual indication that a draft is present.

Figure 20:
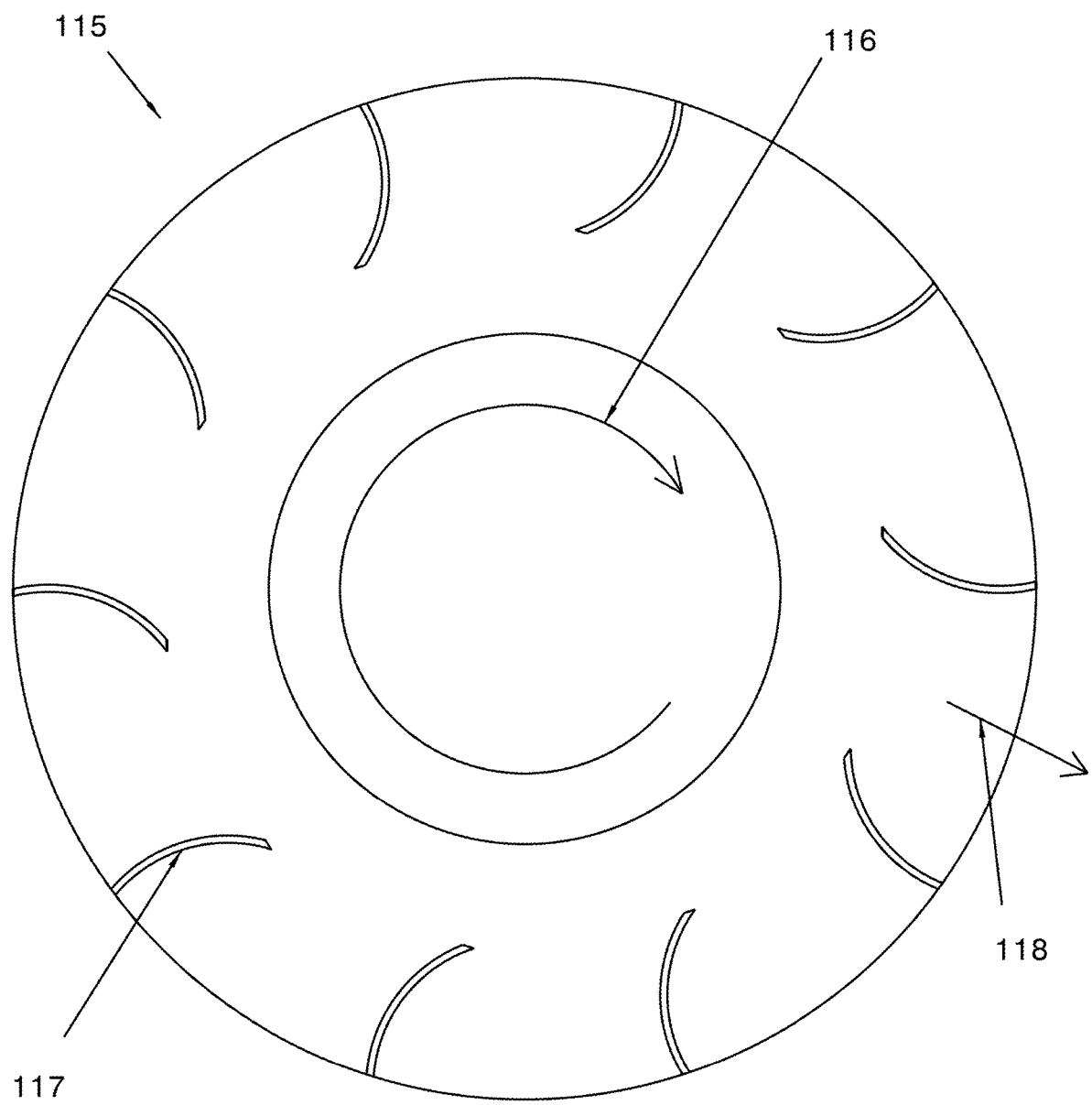
FIG. 20 is a drawing showing an embodiment using curved vanes.

With reference to FIG. 20 a view, 115, of a method to remove circular flow from the axial or radial fan filtration units, 2 and 36, of FIG. 1 and FIG. 5 is shown. The circular rotation of the air, 116, is corrected by the curved vanes, 117, producing radial air flow, 118.

Figure 21:
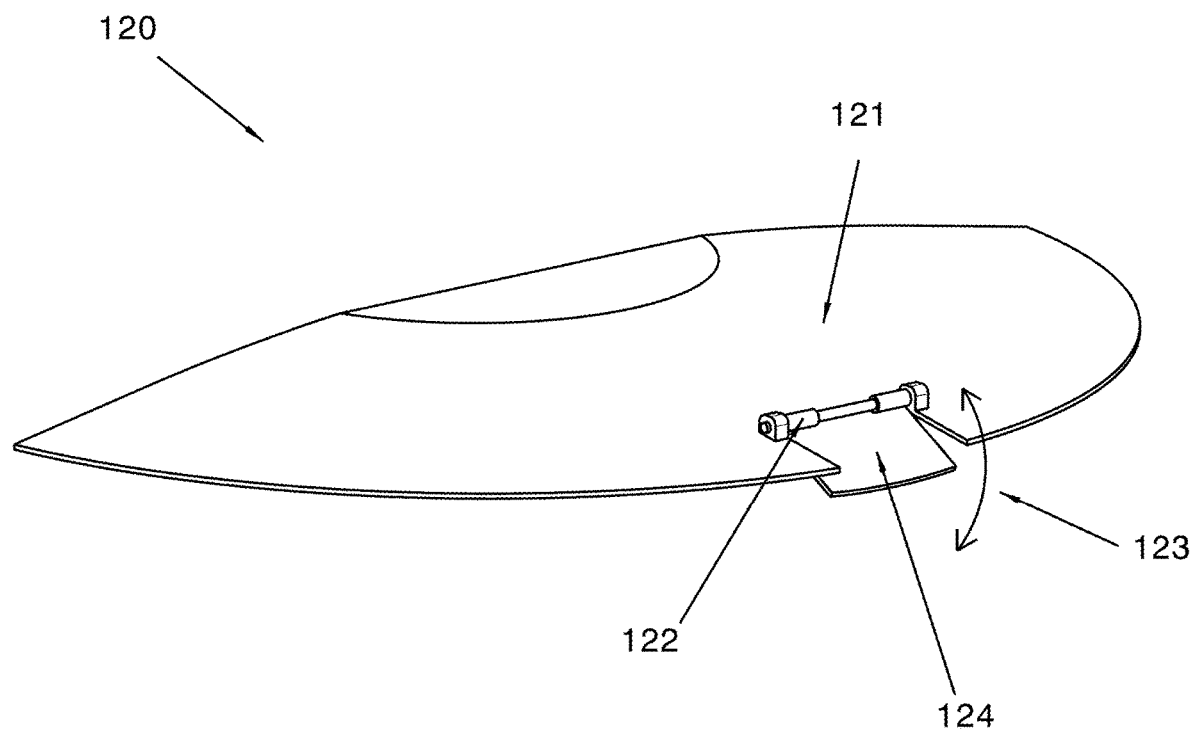
FIG. 21 is a drawing showing an embodiment using hinged vane deflectors.

With reference to FIG. 21 a view, 120, of a method to provide variable air flow deflection of the axial or radial fan filtration units, 2 and 36, of FIG. 1 and FIG. 5 is shown. A portion of the periphery of the upper plate, 121, is cut away to allow the presence of a vane, 124, that can be moved up and down, 123, via a hinge, 122. While only one vane, 124, is shown there can be several vanes, 124, around the periphery of the upper plate, 121.

Figure 22:
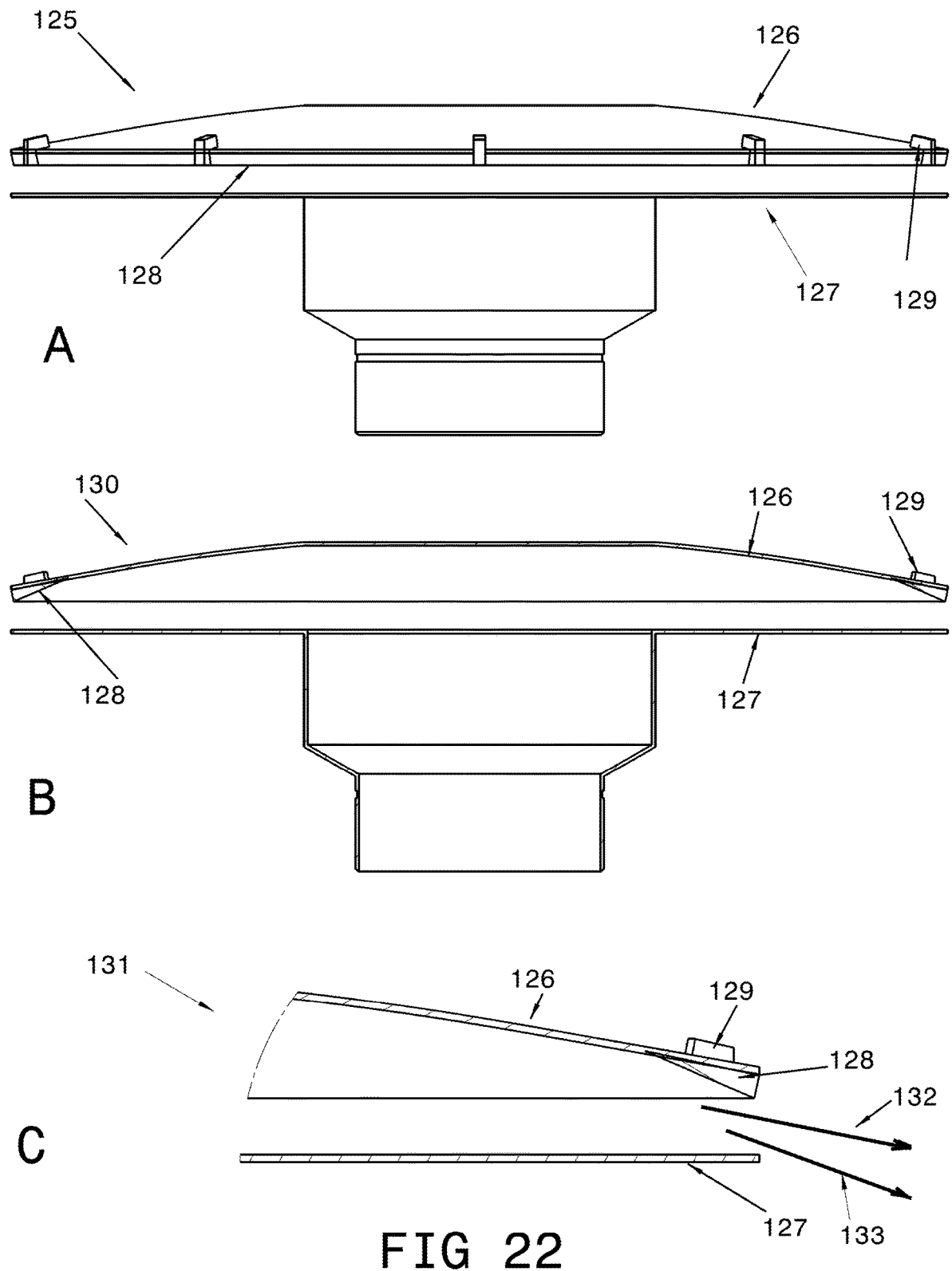
FIG. 22 is a drawing showing an embodiment using a separate air deflector attachment.

With reference to FIG. 22 three views, 22A, B, and C, of a method of providing additional downward air deflection are shown. In view A, the unit, 125, consists of an upper plate, 126, a lower plate, 127, an insert, 128, and attachment hooks, 129. In view B, a cross section through the unit, 130, is shown. And in view C a detailed view, 131, of the air exit area is shown, with the pre insert, 128, air flow, 132, shown along with the post insert, 128, air flow, 133, being more downwardly deflected.

Various types of downward deflectors are possible. For simplicity, multiple deflectors could also be ganged and controlled as one. Likewise, multiple vanes may be controlled together.

Figure 23:
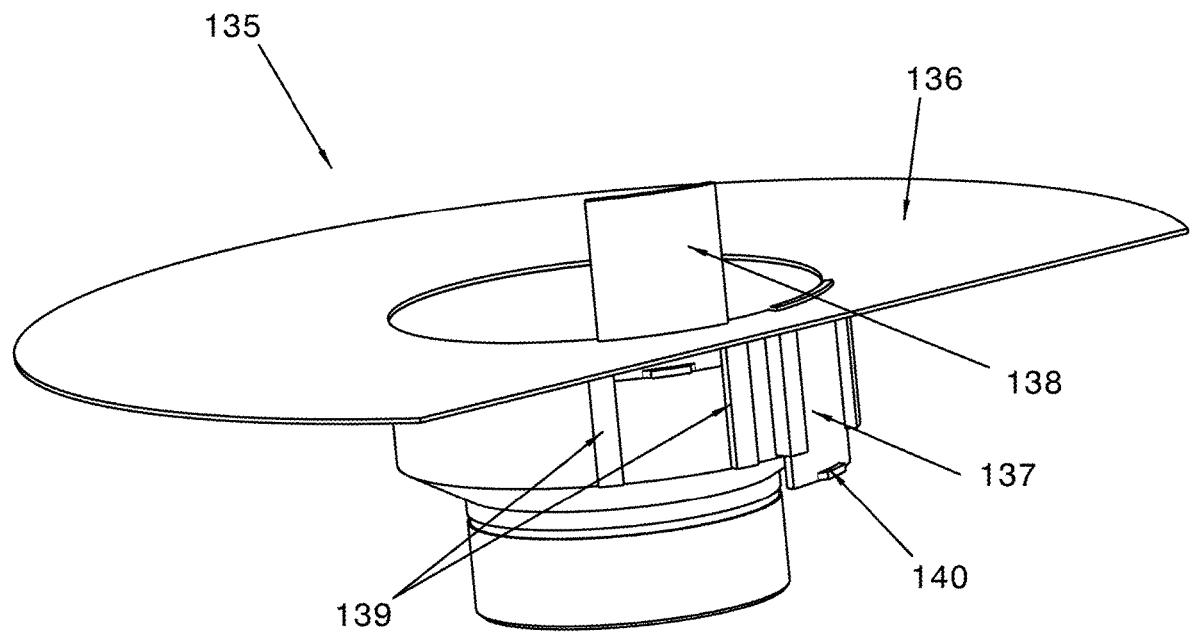
FIG. 23 is a drawing showing an embodiment using a sliding air deflector.

With reference to FIG. 23 the view, 135, shows a method of blocking the air flow in various directions for the axial or radial fan filtration units, 2 and 36, of FIG. 1 and FIG. 5. While only 2 blocking vanes, 137 and 138, are shown they could extend all around bottom plate, 136, in a circular fashion.

These blocking vanes, 137 and 138, can be moved up and down using the tabs, 140, moving in the guides, 139. Blocking vane, 137, is shown in the down position allowing full air flow, while blocking vane, 138, is shown in the up position, blocking air flow.

Figure 24:
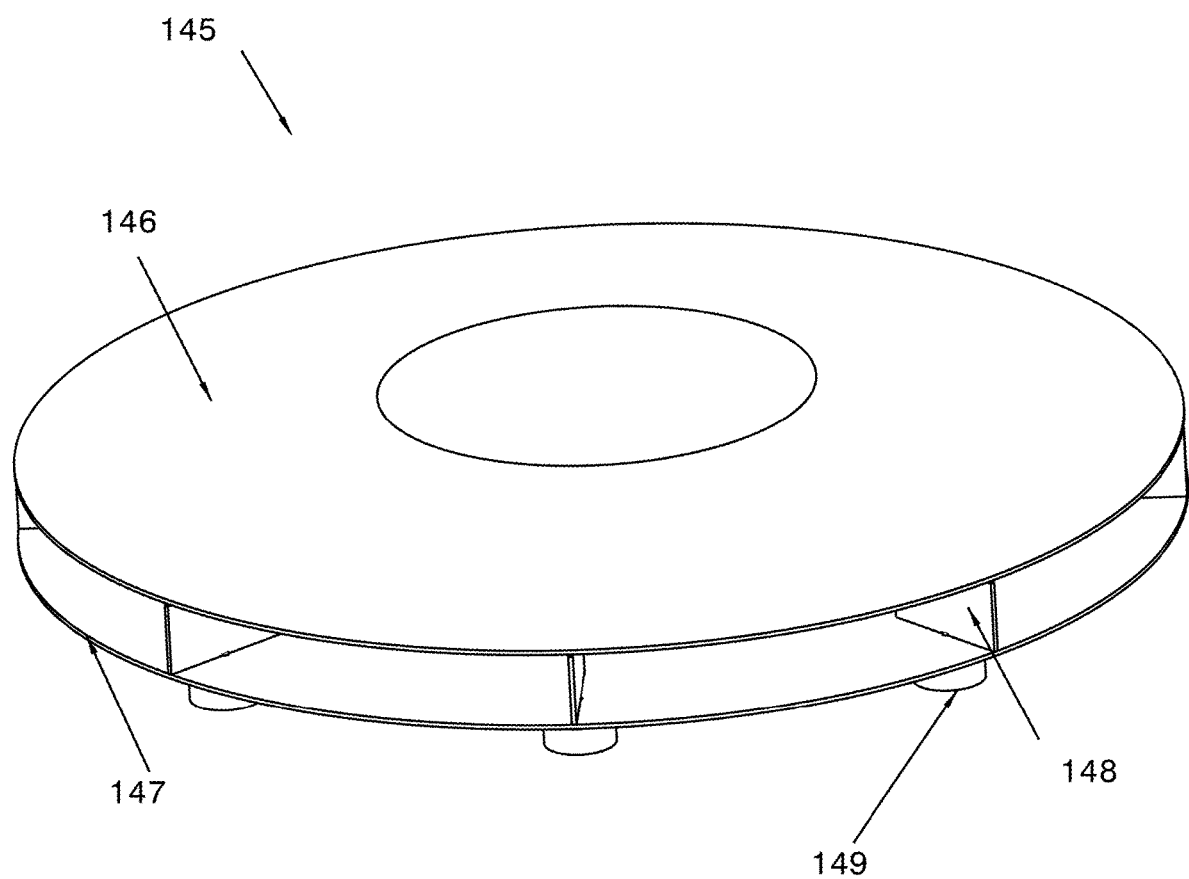
FIG. 24 is a drawing showing an embodiment using a rotational air deflector.

With reference to FIG. 24 the view, 145, shows a method of directing air flow coming out of the openings between the upper plate, 146, and the lower plate, 147, using the guide vanes, 148. These guide vanes, 148, are mounted on shafts connected to knobs, 149, that can be turned to angle the guide vanes, 148, thereby changing the air flow direction.

Figure 25:
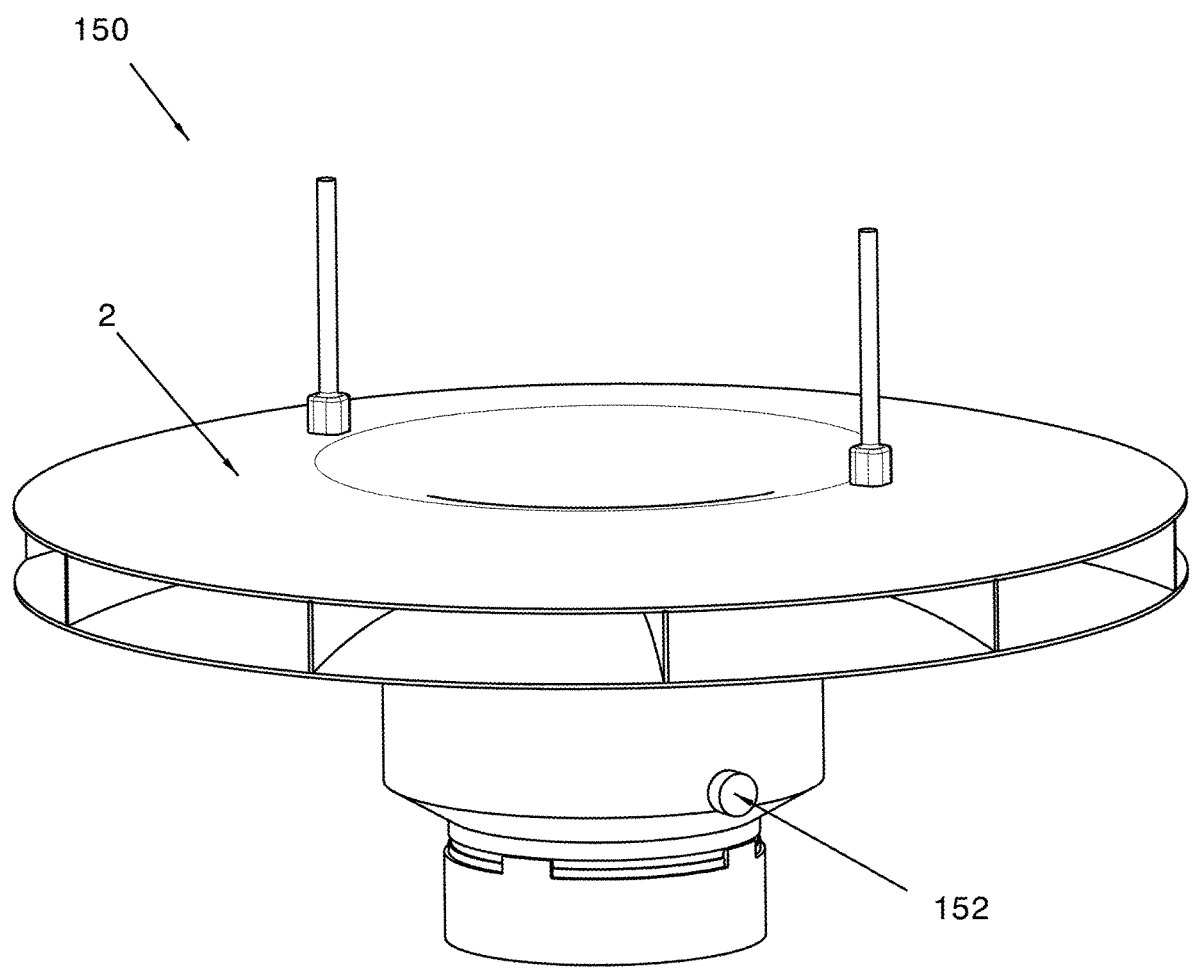
FIG. 25 is a drawing showing an embodiment using a power control knob on an axial air purification unit.

With reference to FIG. 25 the view, 150, shows a control knob, 152, mounted on the side of an axial fan air filtration unit, 2. This knob, 152, controls the electrical power to the motor, either in an on/off fashion or as a variable speed control.

Figure 26:
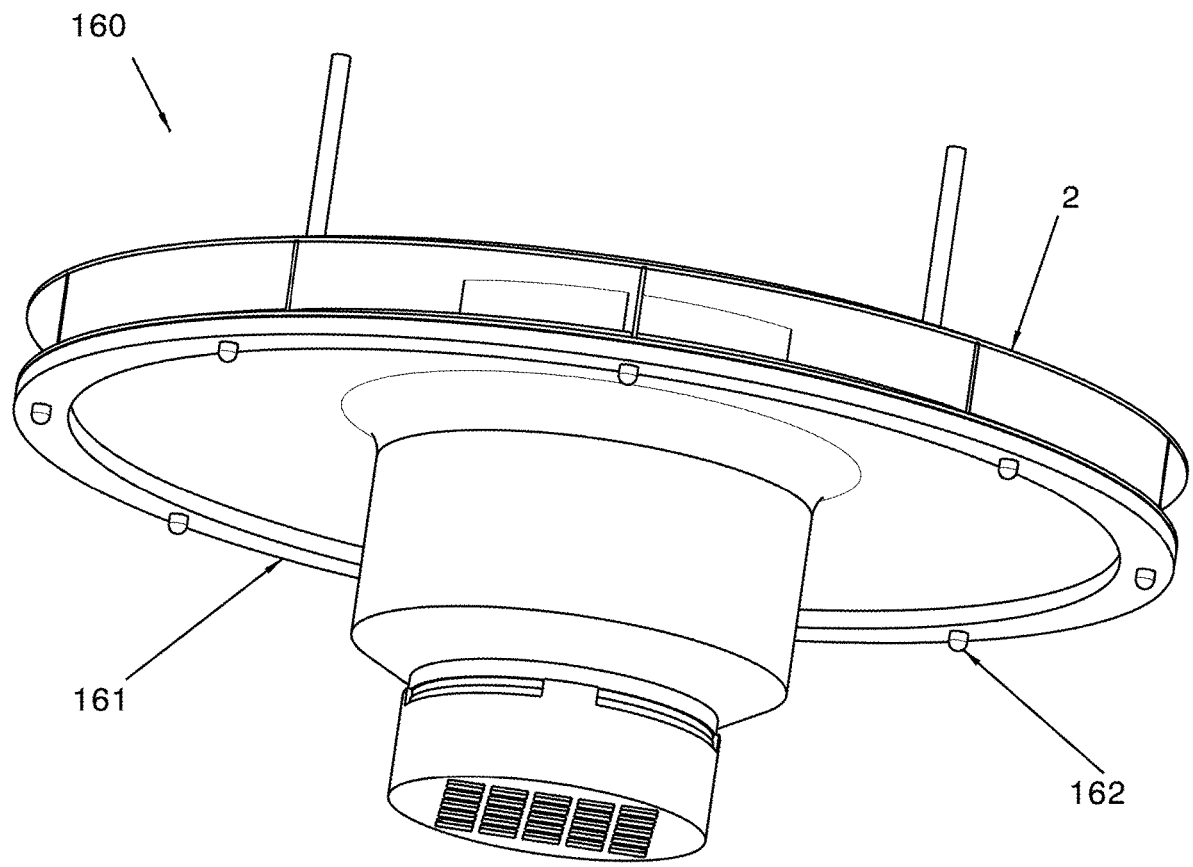
FIG. 26 is a drawing showing an embodiment using a ring lighting unit mounted under the axial fan air filtration unit.

With reference to FIG. 26 the view, 160, shows the axial fan air filtration unit, 2, with a ring lighting unit, 161, mounted to the lower portion of it. Individual lights, 162, which could be incandescent bulbs or LEDs are shown. This ring lighting unit can be used to illuminate a table under the axial fan air filtration unit, 2, or can be used to signal the filter status, etc. Optionally, a diffuser component may be attached to direct the light (not shown).

Practical implementation may include any or all of the features described herein. These and other aspects, features and various combinations may be expressed as methods, systems, products, kits, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described processes, and other components can be added to, or removed from, the described product. Accordingly, other embodiments are within the scope of the claims.

Throughout the description and claims of this specification, the word "comprise", "include" and "contain" and variations of them mean "including but not limited to" and they are not intended to (and do not) exclude other components, integers or steps. Throughout this specification, the singular encompasses the plural unless the context requires otherwise. In particular, wherein the indefinite article is used, the specification is to be understood as contemplating plurality as well as singularity, unless the context requires otherwise.

What is claimed is:

1. An air purification unit, comprising:
    a unit body adapted to be mounted at a mounting height at or above the approximate head height of individuals while seated, and in a position between the individuals, the unit body including:
        an upper plate;
        a lower plate; and
        a motorized fan system within the unit body configured to draw air from at least one inlet proximate the bottom of the unit body;
    a filter positioned in communication with the inlet and the fan system for filtering air drawn through the inlet;
    the unit body having at least two ducted outlets for discharging filtered air toward the individuals, wherein the ducted outlets are shaped so that discharged filtered air prevents cross-flow of breath air between the individuals.

2. The air purification unit of claim 1, wherein each ducted outlet includes at least one substantially horizontal vane.

3. The air purification unit of claim 1, wherein the filter is a HEPA filter.

4. The air purification unit of claim 1, wherein the filter is contained in a releasable filter holder.

5. The air purification unit of claim 1, further comprising a base for allowing the unit to be mounted on a surface.

6. The air purification unit of claim 5, wherein the surface is a table, desk or shelf.

7. The air purification unit of claim 5, wherein the inlet is in the base.

8. The air purification unit of claim 1, wherein the unit body includes hangers.

9. The air purification unit of claim 8, wherein the inlet is on a bottom surface of the unit body.

10. The air purification unit of claim 2, wherein the vanes are fixed.

11. The air purification unit of claim 2, wherein the vanes are adjustable.

12. The air purification unit of claim 2, wherein the vanes are substantially planar.

13. The air purification unit of claim 2, wherein the vanes are substantially curved.

14. The air purification unit of claim 1, wherein the unit body includes an air flow guide.

15. The air purification unit of claim 14, wherein the air flow guide is mounted on the upper plate.

16. The air purification unit of claim 1, wherein the motorized fan system is mounted at least in part above the upper plate.

17. The air purification unit of claim 1, wherein the motorized fan system is mounted at least in part between the upper plate and the lower plate.

18. The air purification unit of claim 1, wherein the motorized fan system includes a motor of a type selected from the group consisting of: AC induction, DC brushed, and DC brushless.

19. The air purification unit of claim 18, wherein the motor has a speed of at least about 500 rpm.

20. The air purification unit of claim 19, wherein the motor speed is adjustable.

21. The air purification unit of claim 1, wherein the ducted outlets are disposed so as to each direct a flow of filtered air in a plane different from that of the air inlet.

* * * * *